US012700898B2

(12) United States Patent (10) Patent No.: US 12,700,898 B2
Bhamri et al. (45) Date of Patent: Aug. 4, 2026

(54) CONFIGURING SHARED REFERENCE BEAMS

(71) Applicant: Lenovo (Singapore) Pte. Ltd., New Tech Park (SG)

(72) Inventors: Ankit Bhamri, Rödermark (DE); Ali Ramadan Ali, Kraiburg am Inn (DE); Robin Thomas, Bad Nauheim (DE); Karthikeyan Ganesan, Kronberg im Taunus (DE); Hyejung Jung, Northbrook, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 393 days.

(21) Appl. No.: 18/546,502

(22) PCT Filed: Feb. 14, 2022

(86) PCT No.: PCT/IB2022/051305
§ 371 (c)(1),
(2) Date: Aug. 15, 2023

(87) PCT Pub. No.: WO2022/172248
PCT Pub. Date: Aug. 18, 2022

(65) Prior Publication Data
US 2024/0137087 A1      Apr. 25, 2024
US 2024/0235633 A9      Jul. 11, 2024

Related U.S. Application Data

(60) Provisional application No. 63/149,589, filed on Feb. 15, 2021.

(51) Int. Cl.
*H04B 7/06*          (2006.01)
*H04B 7/08*          (2006.01)

(52) U.S. Cl.
CPC ........... *H04B 7/0617* (2013.01); *H04B 7/086* (2013.01)

(58) Field of Classification Search
CPC .... H04B 7/0617; H04B 7/086; H04B 7/0615; H04B 7/0613; H04B 7/06; H04B 7/0842; H04B 7/084; H04B 7/08
See application file for complete search history.

(56) References Cited

U.S. PATENT DOCUMENTS 12,580,618  B1 *  3/2026  Rofougaran ......... H04B 7/0617
2018/0212651  A1 *  7/2018  Li ...................... H04B 7/06958
(Continued)

OTHER PUBLICATIONS

PCT/IB2022/051305, "Notification of Transmittal of the International Search Report and the Written Opinion of the International Searching Authority, or the Declaration", International Searching Authority, Jul. 15, 2022, pp. 1-21.
(Continued)

*Primary Examiner* — Jeffrey M Rutkowski
(74) *Attorney, Agent, or Firm* — Kunzler Needham & Hilton; Bruce R. Needham

(57) ABSTRACT

Apparatuses, methods, and systems are disclosed for configuring shared reference beams. One method includes receiving a first configuration including a first shared reference beam ("SRB") and a first beam ID associated with the first SRB. The method includes receiving a second configuration including a second SRB relative to the first SRB and a second beam ID associated with the second SRB. The method includes receiving a third configuration including shared reference signals for channel measurement and reporting. The shared reference signals are quasi-co-located with the first SRB. The method includes receiving a fourth configuration including a shared beam ID for wireless communication with the network entity, the shared beam ID including the first beam ID and/or the second beam ID. The
(Continued)

method includes performing the wireless communication using a shared beam associated with the shared beam ID.

20 Claims, 12 Drawing Sheets

(56) References Cited

U.S. PATENT DOCUMENTS

| | | | |
|---|---|---|---|
| 2018/0219600 A1* | 8/2018 | Kim | H04B 7/0617 |
| 2019/0045377 A1* | 2/2019 | Kakishima | H04B 7/0617 |
| 2019/0349061 A1 | 11/2019 | Cirik et al. | |
| 2019/0393946 A1 | 12/2019 | Guo et al. | |

OTHER PUBLICATIONS

Rezaie et al., "Location- and Orientation-Aided Millimeter Wave Beam Selection Using Deep Learning." ICC 2020—2020 IEEE International Conference on Communications (ICC), Jun. 1, 2020, pp. 1-7.

Samsung, "Multi-beam enhancements", 3GPP TSG RAN WG1 #103-e R1-2008148, Oct. 26-Nov. 13, 2020, pp. 1-20.

Interdigital, Inc., "Enhancements for M-TRP Transmission to Support HST-SFN in Rel-17", 3GPP TSG RAN WG1 #104-e R1-2100067, Jan. 25-Feb. 5, 2021, pp. 1-13.

ZTE et al., "Applications of Artificial Intelligence in MIMO Networks", 3GPP TSG RAN Meeting #89e RP-201771, Sep. 14-18, 2020, pp. 1-12.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

3GPP, "3rd Generation Partnership Project; Technical Specification Group Radio Access Network; NR; User Equipment (UE) radio access capabilities (Release 16)", 3GPP TS 38.306 V16.3.0, Dec. 2020, pp. 1-135.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

3GPP, "3rd Generation Partnership Project; Technical Specification Group Radio Access Network; NR; Radio Resource Control (RRC) protocol specification(Release 16)", 3GPP TS 38.331 V16.3.1, Jan. 2021, pp. 1-932.

* cited by examiner

200

300

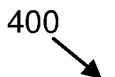
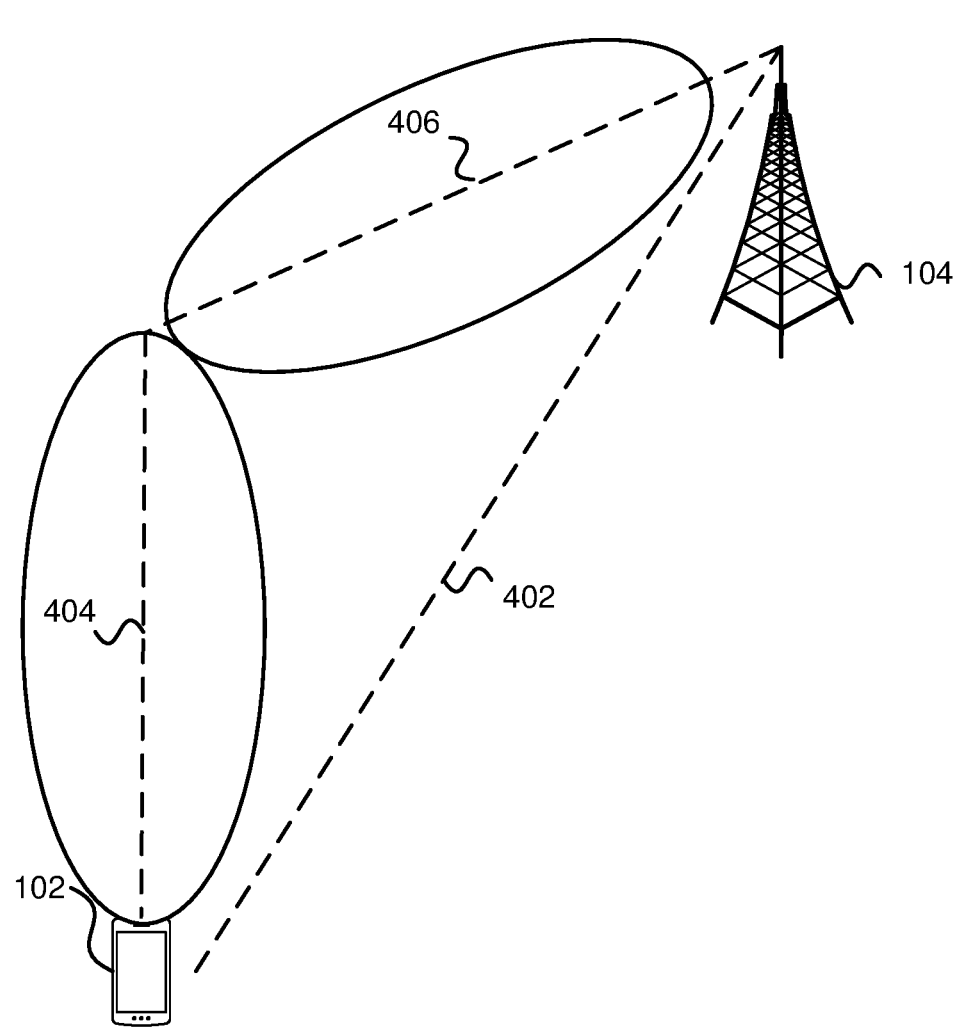
FIG. 4

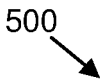
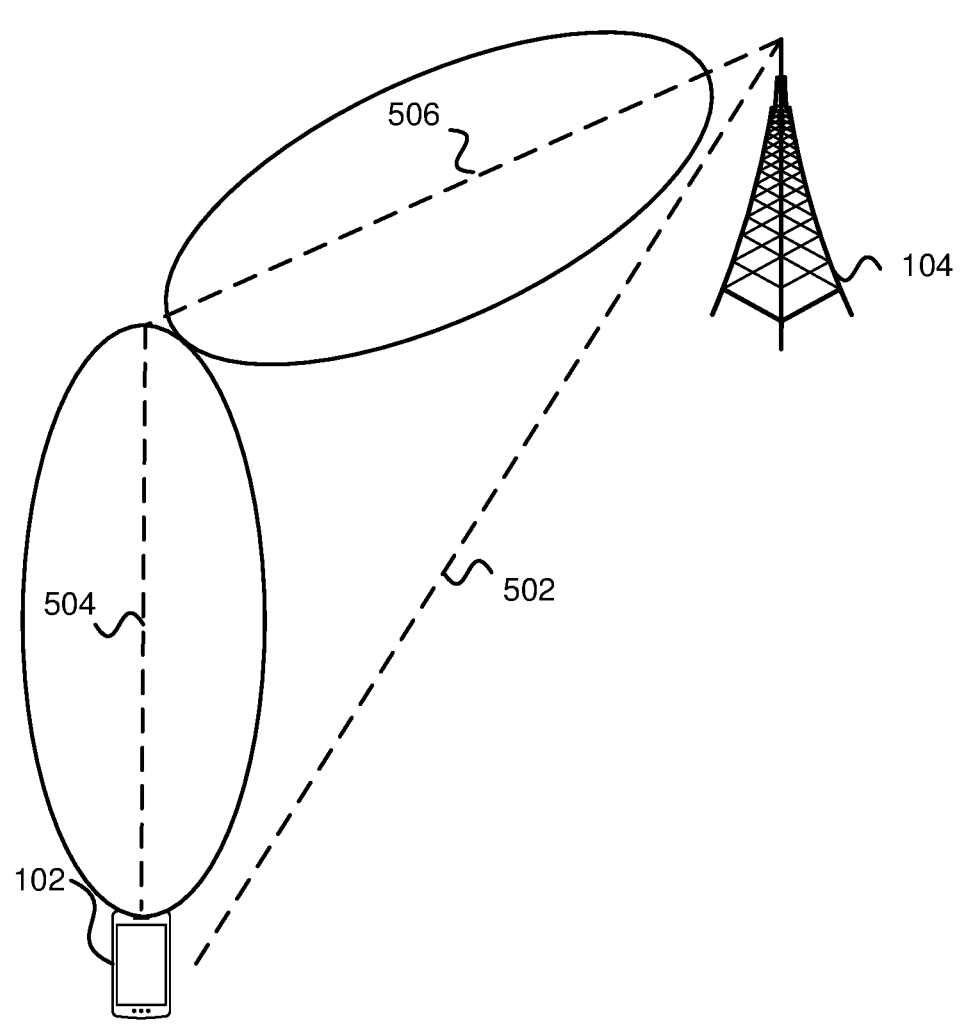
FIG. 5

600
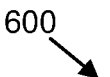
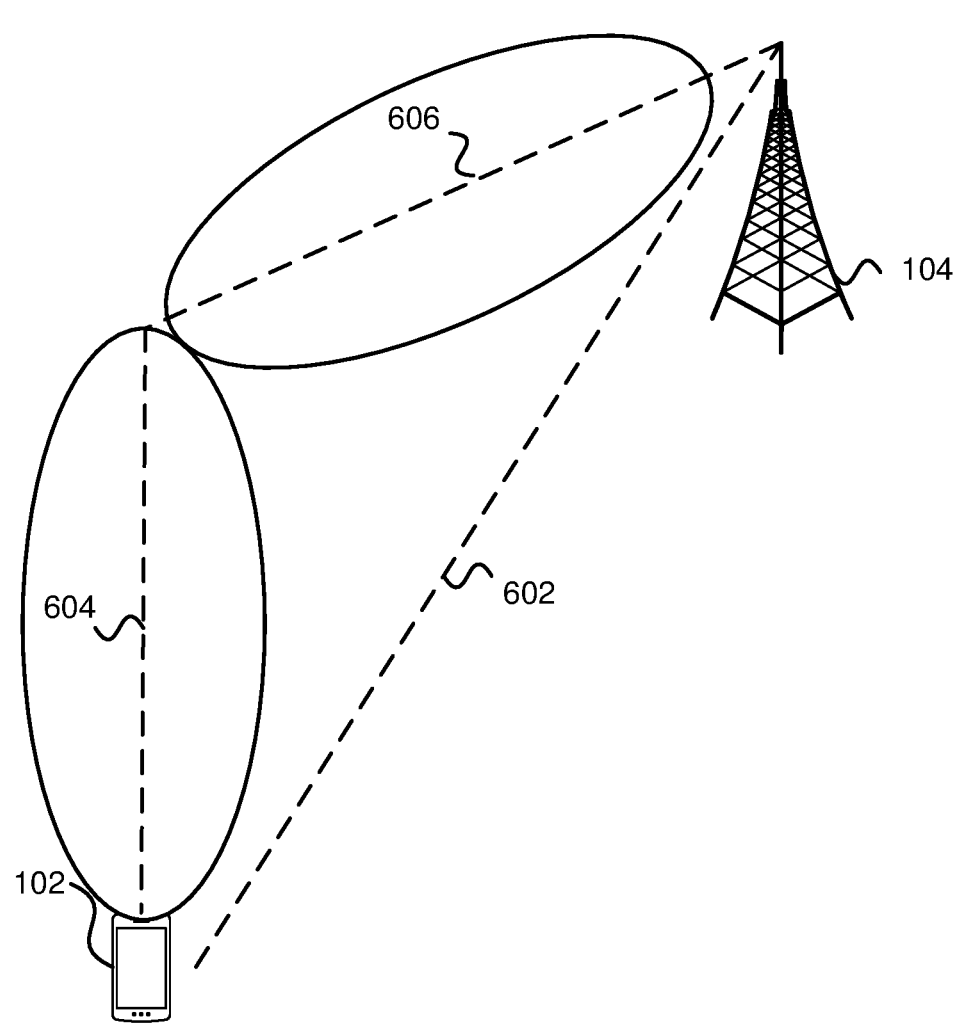
FIG. 6

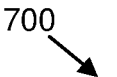
700
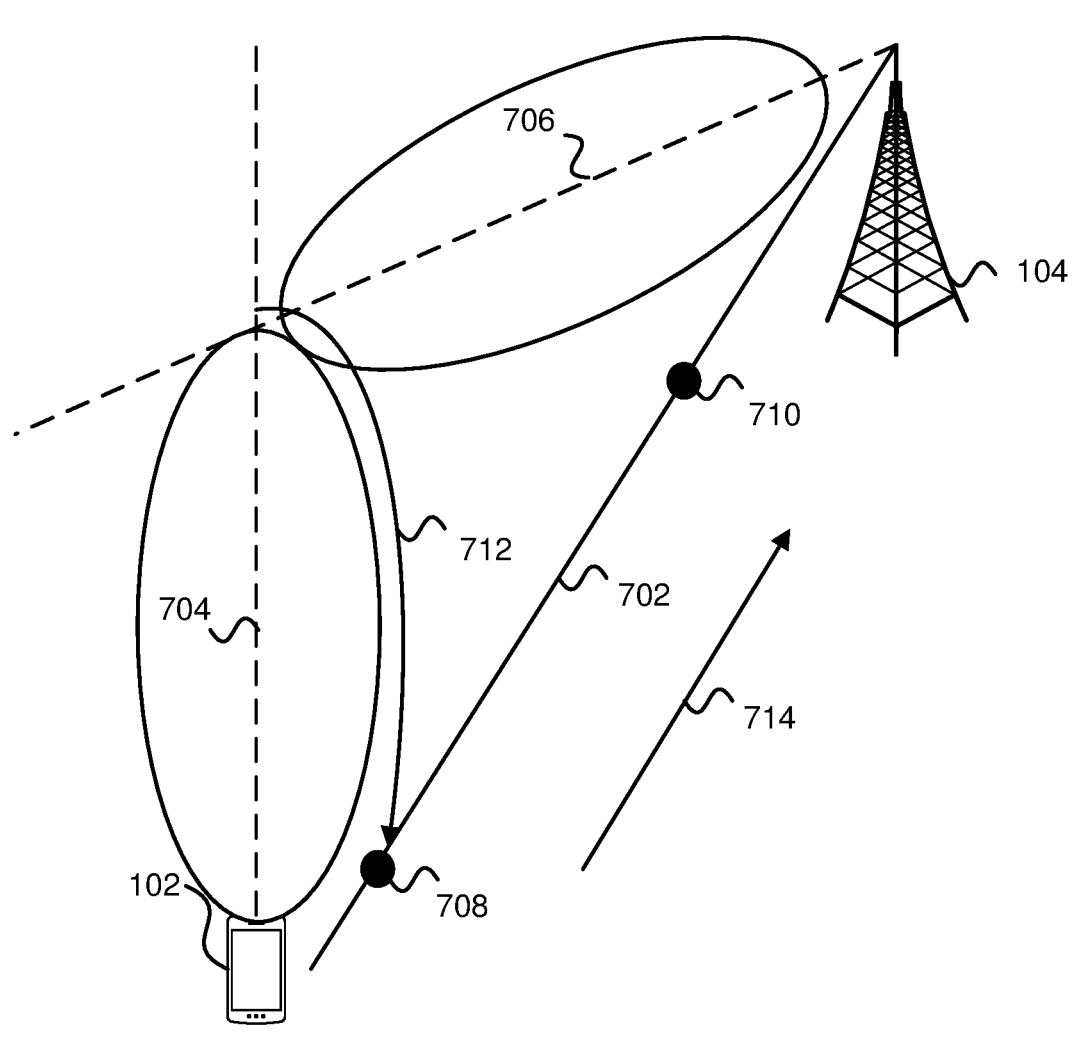
FIG. 7

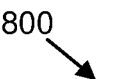
800
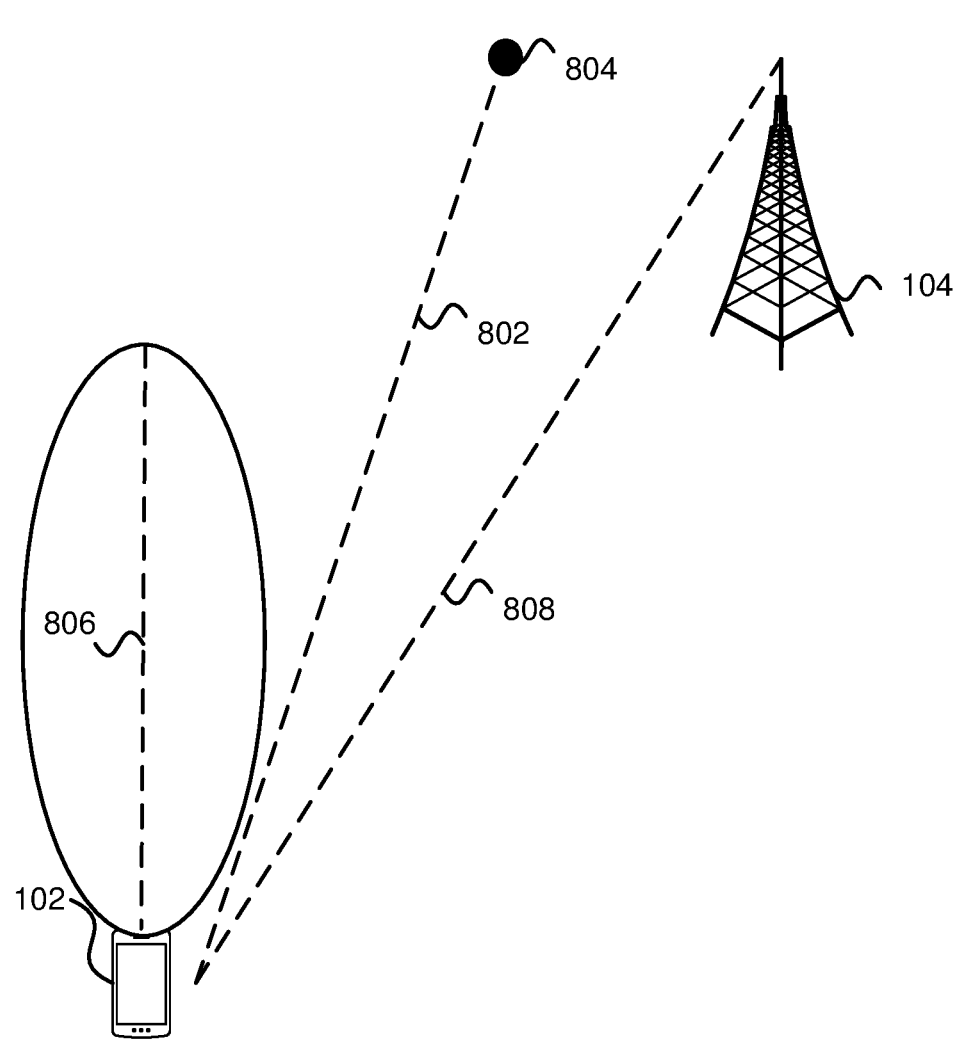
FIG. 8

900

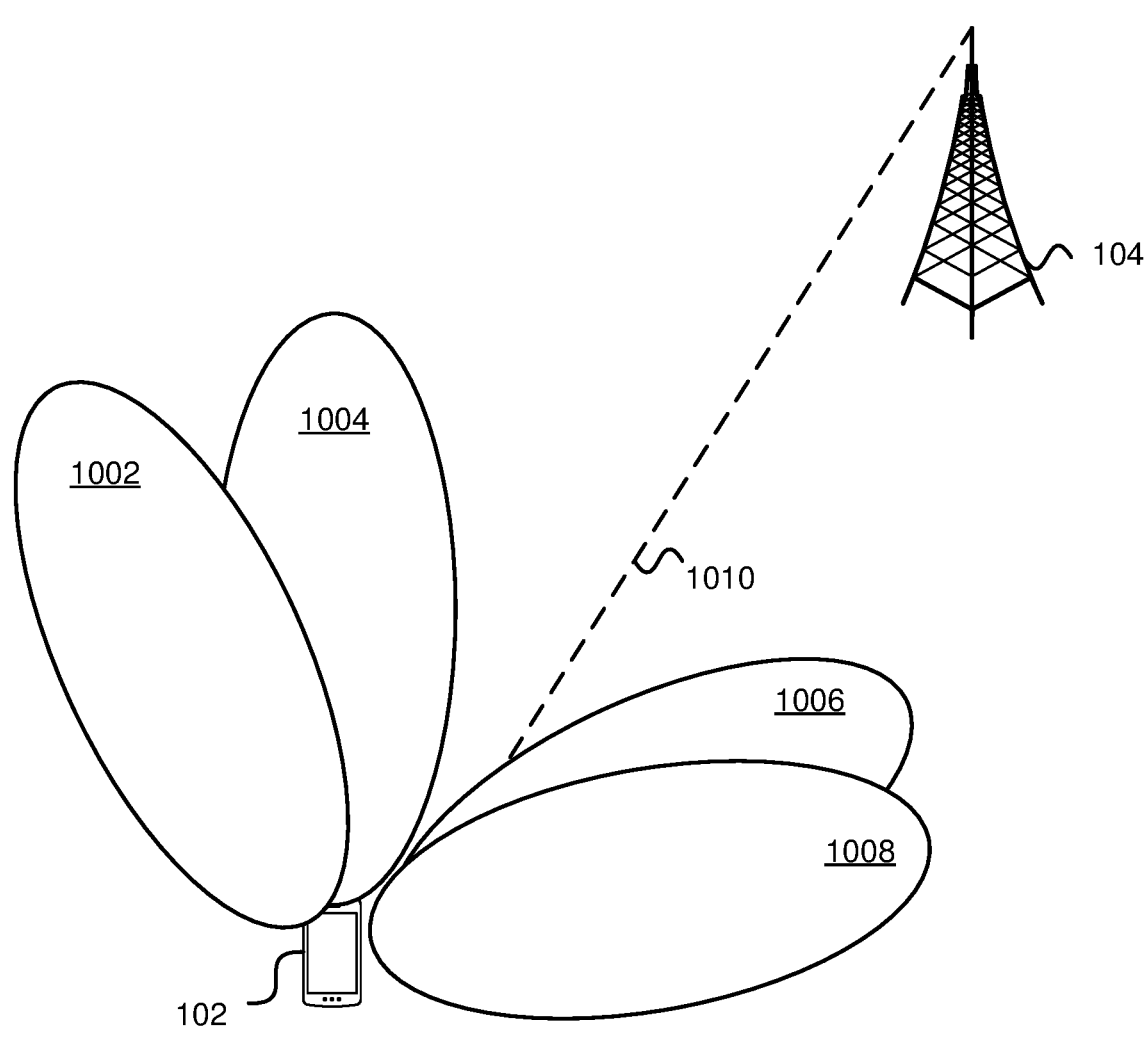
FIG. 10

1100

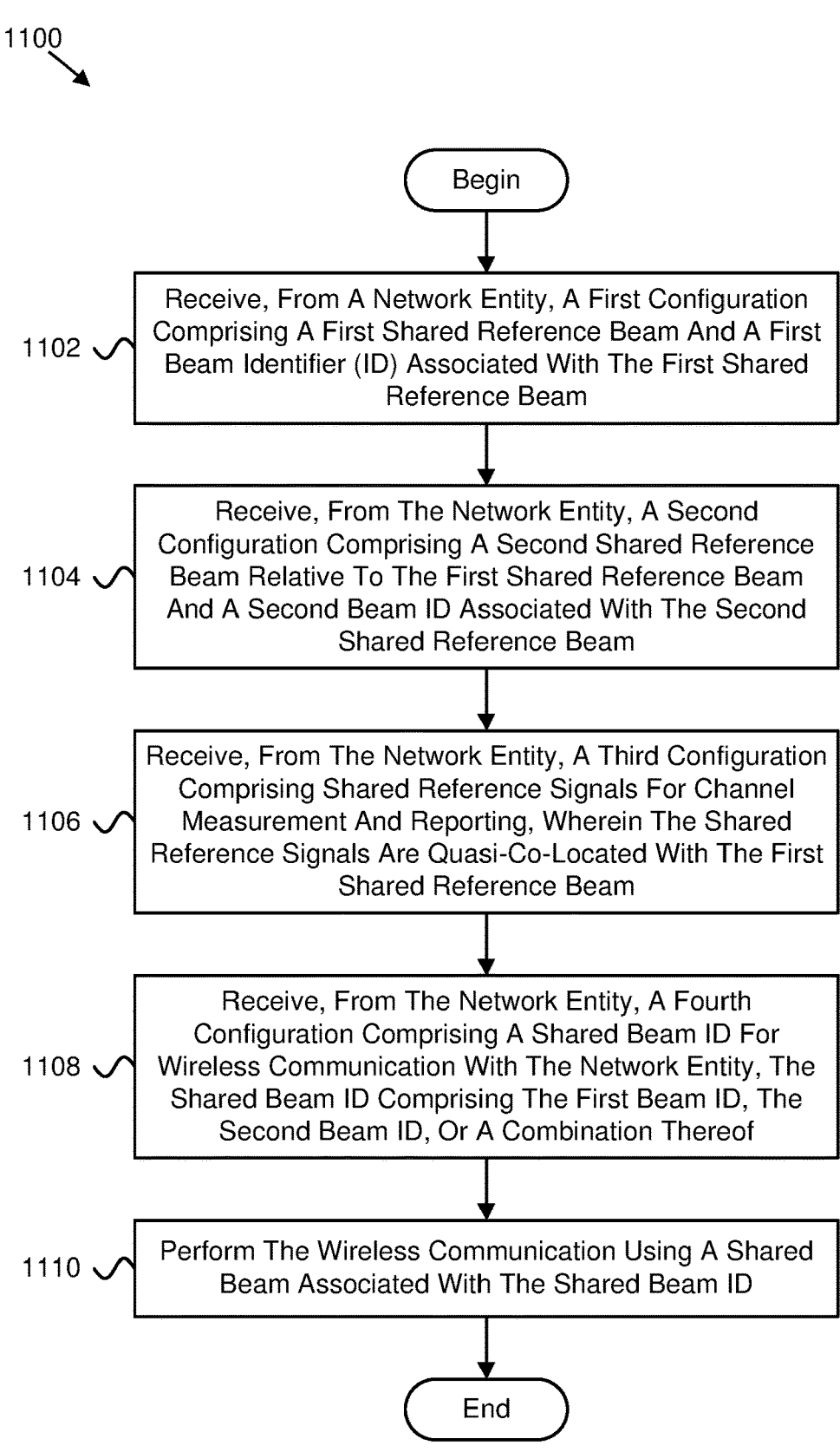

Begin

1102 ⌇ Receive, From A Network Entity, A First Configuration Comprising A First Shared Reference Beam And A First Beam Identifier (ID) Associated With The First Shared Reference Beam 1104 ⌇ Receive, From The Network Entity, A Second Configuration Comprising A Second Shared Reference Beam Relative To The First Shared Reference Beam And A Second Beam ID Associated With The Second Shared Reference Beam 1106 ⌇ Receive, From The Network Entity, A Third Configuration Comprising Shared Reference Signals For Channel Measurement And Reporting, Wherein The Shared Reference Signals Are Quasi-Co-Located With The First Shared Reference Beam 1108 ⌇ Receive, From The Network Entity, A Fourth Configuration Comprising A Shared Beam ID For Wireless Communication With The Network Entity, The Shared Beam ID Comprising The First Beam ID, The Second Beam ID, Or A Combination Thereof 1110 ⌇ Perform The Wireless Communication Using A Shared Beam Associated With The Shared Beam ID End

CONFIGURING SHARED REFERENCE BEAMS

CROSS-REFERENCE TO RELATED APPLICATIONS

This application claims priority to U.S. Patent Application Ser. No. 63/149,589 entitled "APPARATUSES, METHODS, AND SYSTEMS FOR A SHARED BEAM-MANAGEMENT FRAMEWORK" and filed on Feb. 15, 2021 for Ankit Bhamri, which is incorporated herein by reference in its entirety.

FIELD

The subject matter disclosed herein relates generally to wireless communications and more particularly relates to configuring shared reference beams.

BACKGROUND

In certain wireless communications networks, at least one channel state information ("CSI") reference signal ("RS") ("CSI-RS") may be used. In such networks, CSI-RS overhead and/or CSI-RS overhead reporting may consume a large amount of resources.

BRIEF SUMMARY

Methods for configuring shared reference beams are disclosed. Apparatuses and systems also perform the functions of the methods. One embodiment of a method includes receiving, at a user equipment from a network entity, a first configuration including a first shared reference beam and a first beam identifier (ID) associated with the first shared reference beam. In some embodiments, the method includes receiving, from the network entity, a second configuration including a second shared reference beam relative to the first shared reference beam and a second beam ID associated with the second shared reference beam. In certain embodiments, the method includes receiving, from the network entity, a third configuration including shared reference signals for channel measurement and reporting. The shared reference signals are quasi-co-located with the first shared reference beam. In various embodiments, the method includes receiving, from the network entity, a fourth configuration including a shared beam ID for wireless communication with the network entity, the shared beam ID including the first beam ID, the second beam ID, or a combination thereof. In some embodiments, the method includes performing the wireless communication using a shared beam associated with the shared beam ID.

One apparatus for configuring shared reference beams includes a user equipment. In some embodiments, the apparatus includes a transceiver that: receives, from a network entity, a first configuration including a first shared reference beam and a first beam identifier (ID) associated with the first shared reference beam; receives, from the network entity, a second configuration including a second shared reference beam relative to the first shared reference beam and a second beam ID associated with the second shared reference beam; receives, from the network entity, a third configuration including shared reference signals for channel measurement and reporting, wherein the shared reference signals are quasi-co-located with the first shared reference beam; receives, from the network entity, a fourth configuration including a shared beam ID for wireless communication with the network entity, the shared beam ID including the first beam ID, the second beam ID, or a combination thereof; and performs the wireless communication using a shared beam associated with the shared beam ID.

Another embodiment of a method for configuring shared reference beams includes transmitting, from a base station to a user equipment (UE), a first configuration including a first shared reference beam and a first beam identifier (ID) associated with the first shared reference beam. In some embodiments, the method includes transmitting, to the UE, a second configuration including a second shared reference beam relative to the first shared reference beam and a second beam ID associated with the second shared reference beam. In certain embodiments, the method includes transmitting, to the UE, a third configuration including shared reference signals for channel measurement and reporting. The shared reference signals are quasi-co-located with the first shared reference beam. In various embodiments, the method includes transmitting, to the UE, a fourth configuration including a shared beam ID for wireless communication with the UE, the shared beam ID including the first beam ID, the second beam ID, or a combination thereof. In some embodiments, the method includes performing the wireless communication using a shared beam associated with the shared beam ID.

Another apparatus for configuring shared reference beams includes a base station. In some embodiments, the apparatus includes a transceiver that: transmits, to a user equipment (UE), a first configuration including a first shared reference beam and a first beam identifier (ID) associated with the first shared reference beam; transmits, to the UE, a second configuration including a second shared reference beam relative to the first shared reference beam and a second beam ID associated with the second shared reference beam; transmits, to the UE, a third configuration including shared reference signals for channel measurement and reporting, wherein the shared reference signals are quasi-co-located with the first shared reference beam; transmits, to the UE, a fourth configuration including a shared beam ID for wireless communication with the UE, the shared beam ID including the first beam ID, the second beam ID, or a combination thereof, and performs the wireless communication using a shared beam associated with the shared beam ID.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of a system for determining a shared reference RX beam for a UE;

FIG. 5 is a schematic block diagram illustrating one embodiment of a system for determining a common reference RX beam for the UE;

FIG. 6 is a schematic block diagram illustrating another embodiment of a system for determining a common reference RX beam for the UE;

FIG. 7 is a schematic block diagram illustrating one embodiment of a system for determining a reference line orientation based on RSRP measurement;

FIG. 8 is a schematic block diagram illustrating one embodiment of a system having a virtual reference line and an actual reference line;

FIG. 10 is a schematic block diagram illustrating one embodiment of a system for determining new common beams relative to old common beams on a beam category update;

FIG. 11 is a flow chart diagram illustrating one embodiment of a method for configuring shared reference beams.

DETAILED DESCRIPTION

Figure 1:
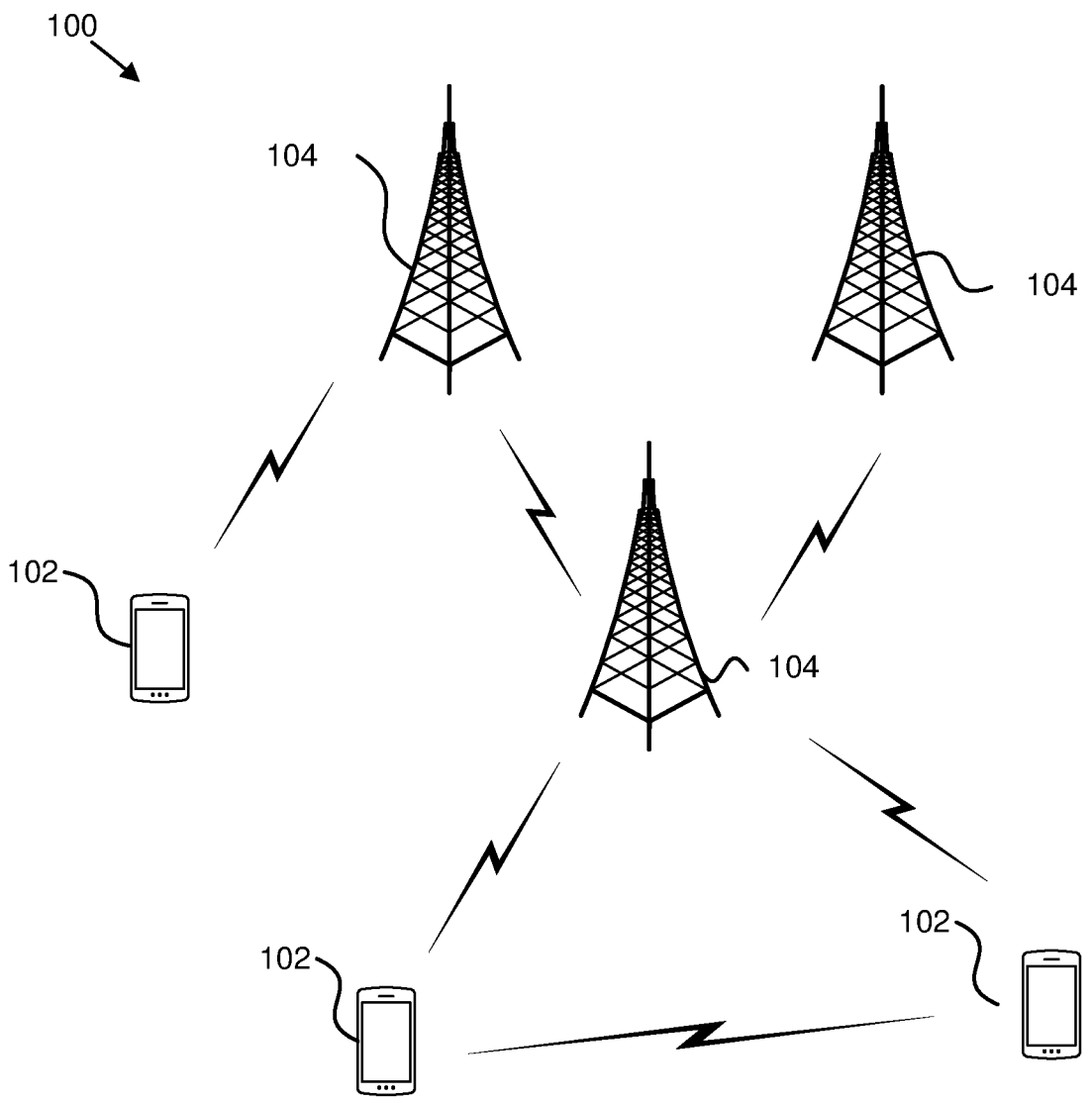
FIG. 1 is a schematic block diagram illustrating one embodiment of a wireless communication system for configuring shared reference beams.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring shared reference beams. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment from a network entity, a first configuration including a first shared reference beam and a first beam identifier (ID) associated with the first shared reference beam. In some embodiments, the remote unit 102 may receive, from the network entity, a second configuration including a second shared reference beam relative to the first shared reference beam and a second beam ID associated with the second shared reference beam. In certain embodiments, the remote unit 102 may receive, from the network entity, a third configuration including shared reference signals for channel measurement and reporting. The shared reference signals are quasi-co-located with the first shared reference beam. In various embodiments, the remote unit 102 may receive, from the network entity, a fourth configuration including a shared beam ID for wireless communication with the network entity, the shared beam ID including the first beam ID, the second beam ID, or a combination thereof. In some embodiments, the remote unit 102 may perform the wireless communication using a shared beam associated with the shared beam ID. Accordingly, the remote unit 102 may be used for configuring shared reference beams.

In certain embodiments, a network unit 104 may transmit, from a base station to a user equipment (UE), a first configuration including a first shared reference beam and a first beam identifier (ID) associated with the first shared reference beam. In some embodiments, the network unit 104 may transmit, to the UE, a second configuration including a second shared reference beam relative to the first shared reference beam and a second beam ID associated with the second shared reference beam. In certain embodiments, the network unit 104 may transmit, to the UE, a third configuration including shared reference signals for channel measurement and reporting. The shared reference signals are quasi-co-located with the first shared reference beam. In various embodiments, the network unit 104 may transmit, to the UE, a fourth configuration including a shared beam ID for wireless communication with the UE, the shared beam ID including the first beam ID, the second beam ID, or a combination thereof. In some embodiments, the network unit 104 may perform the wireless communication using a shared beam associated with the shared beam ID. Accordingly, the network unit 104 may be used for configuring shared reference beams.

Figure 2:
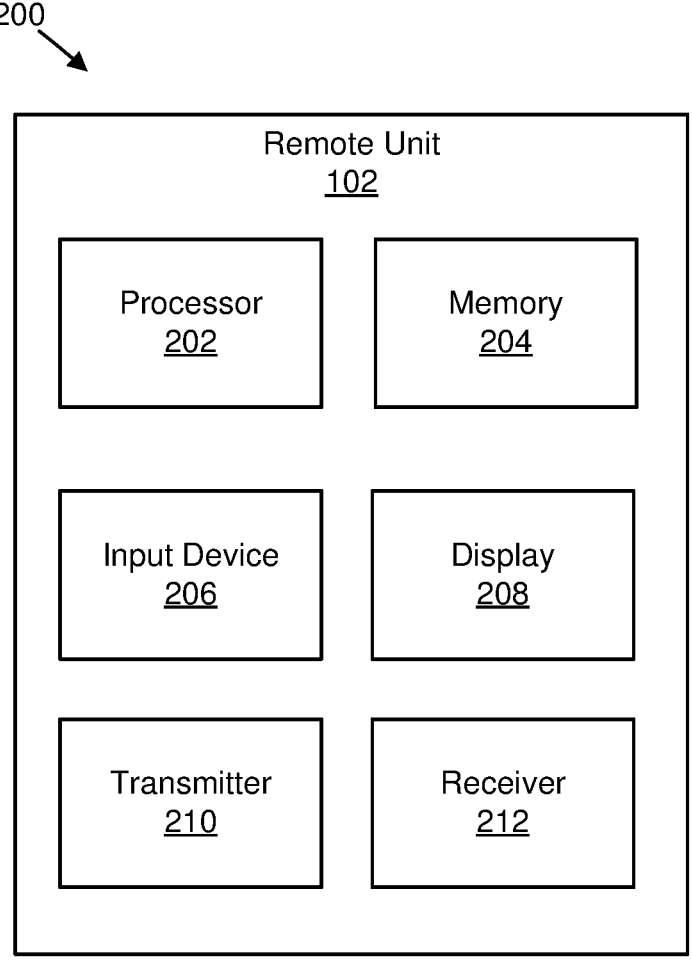
FIG. 2 is a schematic block diagram illustrating one embodiment of an apparatus that may be used for configuring shared reference beams.

FIG. 2 depicts one embodiment of an apparatus 200 that may be used for configuring shared reference beams. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

In some embodiments, the transceiver: receives, from a network entity, a first configuration including a first shared reference beam and a first beam identifier (ID) associated with the first shared reference beam; receives, from the network entity, a second configuration including a second shared reference beam relative to the first shared reference beam and a second beam ID associated with the second shared reference beam; receives, from the network entity, a third configuration including shared reference signals for channel measurement and reporting, wherein the shared reference signals are quasi-co-located with the first shared reference beam; receives, from the network entity, a fourth configuration including a shared beam ID for wireless communication with the network entity, the shared beam ID including the first beam ID, the second beam ID, or a combination thereof, and performs the wireless communication using a shared beam associated with the shared beam ID.

Figure 3:
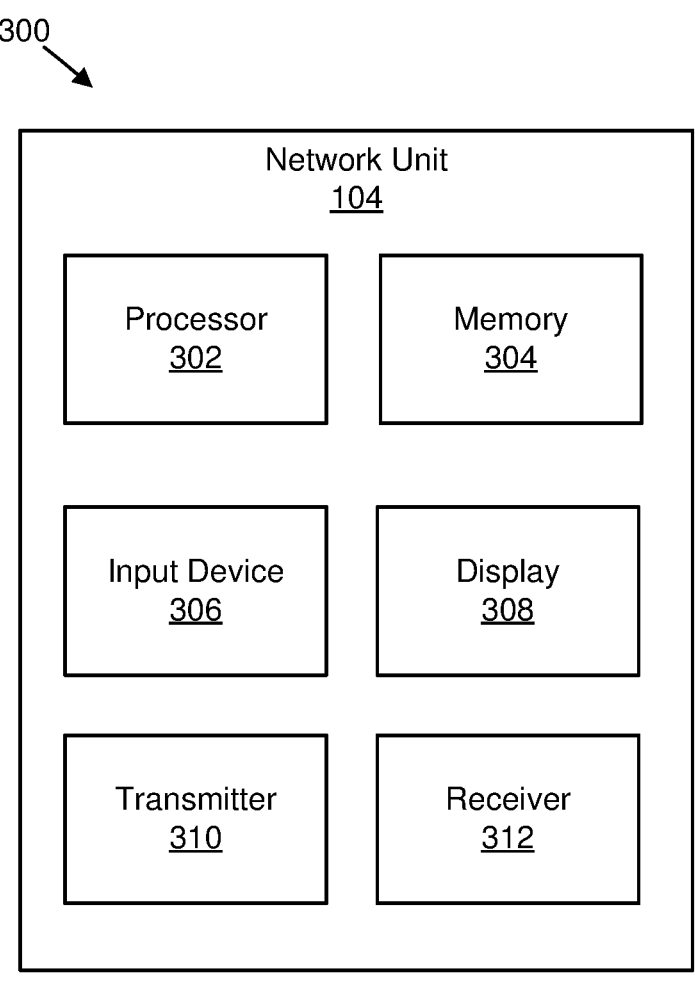
FIG. 3 is a schematic block diagram illustrating one embodiment of an apparatus that may be used for configuring shared reference beams.

FIG. 3 depicts one embodiment of an apparatus 300 that may be used for configuring shared reference beams. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transceiver: transmits, to a user equipment (UE), a first configuration including a first shared reference beam and a first beam identifier (ID) associated with the first shared reference beam; transmits, to the UE, a second configuration including a second shared reference beam relative to the first shared reference beam and a second beam ID associated with the second shared reference beam; transmits, to the UE, a third configuration including shared reference signals for channel measurement and reporting, wherein the shared reference signals are quasi-co-located with the first shared reference beam; transmits, to the UE, a fourth configuration including a shared beam ID for wireless communication with the UE, the shared beam ID including the first beam ID, the second beam ID, or a combination thereof; and performs the wireless communication using a shared beam associated with the shared beam ID.

In certain embodiments, there may be beam management procedures that include initial beam acquisition, beam training, beam refinement, and/or beam failure recovery that rely heavily on constant and/or periodic exchange of reference signals and corresponding measurement reporting between a network and a user equipment ("UE") for both uplink ("UL") and downlink ("DL") control and/or data channel transmissions. In such embodiments, latency and overhead involved for such procedures may be high. Moreover, for higher frequency ranges beams may be required to be very narrow to serve different use cases. In some embodiments, for deployment scenarios with a higher number of users and high user mobility, overhead may be large.

In various embodiments: 1) it may be determined how to share beams across multiple users for sharing beam measurements and shared beam indication; 2) there may be signaling framework for configuring and/or indicating shared beams for multiple users; and/or 3) there may be shared reference signals (e.g., shared and/or common channel state information ("CSI") reference signal ("RS") ("CSI-RS")) configured for multiple users for beam measurements.

In certain embodiments, beam management may be defined as a set of layer 1 and/or layer 2 procedures to acquire and maintain a set of beam pair links (e.g., a beam used at transmit and receive points ("TRPs") for a base station ("BS") paired with a beam used at a UE). Beam pair links may be used for DL and UL transmission and/or reception. A beam management procedure may include: 1) beam sweeping: operation of covering a spatial area with beams transmitted and/or received during a time interval in a predetermined way; 2) beam measurement: for TRPs or a UE to measure characteristics of received beamformed ("BF") signals; 3) beam reporting: for a UE to report information of BF signals based on beam measurement; 4) beam determination: for TRPs or a UE to select of its own transmit ("TX") and/or receive ("RX") beams; 5) beam maintenance: for TRPs or a UE to maintain the candidate beams by beam tracking or refinement to adapt to channel changes due to UE movement or blockage; and/or 6) beam recovery: for a UE to identify new candidate beams after detecting beam failure and subsequently inform a TRP of a beam recovery request with information for indicating the new candidate beams.

In some embodiment there may be two transmission schemes, codebook-based transmissions and non-codebook based transmissions, which may be supported for a physical uplink shared channel ("PUSCH"). For PUSCH transmissions dynamically scheduled by an UL grant in downlink control information ("DCI"), a UE may, upon detection of a physical downlink control channel ("PDCCH") with a configured DCI format 0_0 or 0_1 transmit the corresponding PUSCH as indicated by that DCI.

In various embodiments, for PUSCH scheduled by DCI format 0_0 on a cell, a UE may transmit PUSCH according to a spatial relation, if applicable, corresponding to a PUCCH resource with the lowest identity ("ID") within an active UL bandwidth part ("BWP") of a cell, and the PUSCH transmission may be based on a single antenna port. A spatial setting for a PUCCH transmission may be provided by a higher layer parameter PUCCH-SpatialRelationInfo if the UE is configured with a single value for higher layer parameter pucch-SpatialRelationInfold; otherwise, if the UE is provided with multiple values for higher layer parameter PUCCH-SpatialRelationInfo, the UE determines a spatial setting for the PUCCH transmission based on a received PUCCH spatial relation activation and/or deactivation medium access control ("MAC") control element ("CE"). The UE applies a corresponding setting for a spatial domain filter to transmit PUCCH 3 msec after the slot where the UE transmits hybrid automatic repeat request ("HARQ") acknowledgment ("ACK") ("HARQ-ACK") information with an ACK value corresponding to a PDSCH reception providing the PUCCH-SpatialRelationInfo.

In certain embodiments, for codebook-based transmission, PUSCH may be scheduled by DCI format 0_0 or DCI format 0_1. If a PUSCH is scheduled by DCI format 01, a UE determines its PUSCH transmission precoder based on sounding reference signal ("SRS") resource indicator ("SRI"), transmitted precoder matrix indicator ("TPMI"), and the transmission rank from the DCI, given by DCI fields of an SRS resource indicator and precoding information and a number of layers. The TPMI may be used to indicate a precoder to be applied over the antenna ports {0 . . . v–1} and that corresponds to the SRS resource selected by the SRI (e.g., unless a single SRS resource is configured for a single SRS-ResourceSet set to 'codebook'). The transmission precoder is selected from the uplink codebook that has a number of antenna ports equal to higher layer parameter nrofSRS-Ports in SRS-Config. If the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI before slot n. The UE determines its codebook subsets based on TPMI and upon the reception of higher layer parameter codebookSubset in PUSCH-Config which may be configured with 'fullyAndPartialAndNonCoherent', or 'partialAndNonCoherent', or 'nonCoherent' depending on the UE capability. The maximum transmission rank may be configured by the higher parameter maxRank in PUSCH-Config.

In some embodiments, for non-codebook based transmission, PUSCH may be scheduled by DCI format 0_0 or DCI format 0_1. The UE may determine its PUSCH precoder and transmission rank based on the wideband SRI if multiple SRS resources are configured in a SRS resource set with higher layer parameter usage in SRS-ResourceSet set to 'nonCodebook', where the SRI is given by the SRS resource indicator in DCI format 0_1 and only one SRS port is configured for each SRS resource. The indicated SRI in slot n is associated with the most recent transmission of SRS resources identified by the SRI, where the SRS transmission is prior to the PDCCH carrying the SRI before slot n.

In various embodiments, a UE may perform one-to-one mapping from indicated SRIs to indicated demodulation ("DM") RS ("DM-RS" or "DMRS") ports given by DCI format 0_1 in increasing order.

In certain embodiments, for PUSCH scheduled by DCI format 0_0 on a cell and if the higher layer parameter enableDefaultBeamPlForPUSCH0_0 is set 'enabled', a UE is not configured with PUCCH resources on an active UL BWP and the UE is in RRC connected mode, the UE may transmit PUSCH according to the spatial relation, if applicable, with a reference to the RS with 'QCL-Type-D' corresponding to a quasi-co-location ("QCL") assumption of a control resource set ("CORESET") with a lowest ID. For PUSCH scheduled by DCI format 0_0 on a cell and if the higher layer parameter enableDefaultBeamPlForPUSCH0_0 is set 'enabled', the UE is configured with PUCCH resources on the active UL BWP where all the PUCCH resources are not configured with any spatial relation and the UE is in RRC connected mode, the UE may transmit PUSCH according to the spatial relation, if applicable, with a reference to the RS with 'QCL-Type-D' corresponding to the QCL assumption of the CORESET with the lowest ID in case CORESETs are configured on a component carrier ("CC").

In some embodiments, there may be a MAC CE based spatial relation update for aperiodic SRS per resource level and a default UL beam for a SRS resource for latency and overhead reduction in UL beam management.

In various embodiments, CSI reporting feedback for beam management may be handled to use group based beam reporting. However, due to no association with TRPs, the benefit may be limited to reduce overhead from a feedback point of view and TRP-based beam management may not benefit much.

In certain embodiments: 1) if a UE is configured with a CSI-ReportConfig with the higher layer parameter reportQuantity set to 'cri-RSRP' or 'ssb-Index-RSRP', a) if the UE is configured with the higher layer parameter groupBasedBeamReporting set to 'disabled', the UE is not required to update measurements for more than 64 CSI-RS and/or synchronization signal block ("SSB") resources, and the UE may report in a single report nrofReportedRS (e.g., higher layer configured) different CSI-RS resource index ("CRI") or synchronization signal/physical broadcast channel ("SS/PBCH") block resource index ("SSBRI") for each report setting, and b) if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters; and/or 2) if the UE is configured with a CSI-ReportConfig with the higher layer parameter reportQuantity set to 'cri-SINR' or 'ssb-Index-SINR', a) if the UE is configured with the higher layer parameter groupBasedBeamReporting set to 'disabled', the UE may report (e.g., in a single report) nrofReportedRS-ForSINR (e.g., higher layer configured) different CRI or SSBRI for each report setting, and b) if the UE is configured with the higher layer parameter groupBasedBeamReporting set to 'enabled', the UE may report in a single reporting instance two different CRI or SSBRI for each report setting, where CSI-RS and/or SSB resources can be received simultaneously by the UE either with a single spatial domain receive filter, or with multiple simultaneous spatial domain receive filters.

In some embodiments, there is only one QCL type (e.g., qcl-typeD) for spatial relation between the source RS and target RS. This may mean that only a single source to single target beam association can be established. However, with higher frequencies, a number of beams may become higher, therefore, more coarse association may be considered to cover wider areas. In various embodiments, from a transmission configuration indicator ("TCI") point of view, there up to two TCI states corresponding to two TRPs may be indicated. However, this may be limited if there could be a higher number of TRPs for frequency range 2 ("FR2") and beyond.

In certain embodiments: a UE may be configured with a list of up to M TCI-State configurations within the higher layer parameter PDSCH-Config to decode physical downlink shared channel ("PDSCH") according to a detected PDCCH with DCI intended for the UE and the given serving cell, where M depends on the UE capability maxNumber-ConfiguredTCIstatesPerCC. Each TCI-State contains parameters for configuring a QCL relationship between one or two downlink reference signals and the DM-RS ports of the PDSCH, the DM-RS port of PDCCH, or the CSI-RS ports of a CSI-RS resource. The QCL relationship may be configured by the higher layer parameter qcl-Type1 for the first DL RS, and qcl-Type2 for the second DL RS (e.g., if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and/or 4) 'QCL-TypeD': {Spatial Rx parameter}.

In some embodiments, a UE receives an activation command used to map up to 8 TCI states to the codepoints of a DCI field 'Transmission Configuration Indication' in one CC and/or DL BWP or in a set of CCs and/or DL BWPs, respectively. If a set of TCI state IDs are activated for a set of CCs and/or DL BWPs, where the applicable list of CCs is determined by indicated CC in an activation command, the same set of TCI state IDs are applied for all DL BWPs in the indicated CCs.

In various embodiments, a UE supports two TCI states in a codepoint of the DCI field 'Transmission Configuration Indication'. The UE may receive an activation command. The activation command may be used to map up to 8 combinations of one or two TCI states to the codepoints of the DCI field 'Transmission Configuration Indication'. The UE may not be expected to receive more than 8 TCI states in an activation command.

In certain embodiments, if a UE would transmit a physical uplink control channel ("PUCCH") with HARQ-ACK information in slot n corresponding to the PDSCH carrying the activation command, the indicated mapping between TCI states and codepoints of the DCI field 'Transmission Configuration Indication' may be applied starting from the first slot that is after $$\text{slot } n + 3N_{slot}^{subframe,\mu}$$

where u is the subcarrier spacing ("SCS") configuration for the PUCCH. If tci-PresentInDCI is set to "enabled" or tci-PresentInDCI-ForFormat1_2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are QCL with the SS/PBCH block determined in the initial access procedure with respect to 'QCL-TypeA', and if applicable, also with respect to 'QCL-TypeD'.

In some embodiments, if a UE is configured with a higher layer parameter tci-PresentInDCI that is set as 'enabled' for the CORESET scheduling the PDSCH, the UE assumes that the TCI field is present in the DCI format 1_1 of the PDCCH transmitted on the CORESET. If a UE is configured with the higher layer parameter tci-PresentInDCI-ForFormat1_2 for the CORESET scheduling the PDSCH, the UE assumes that the TCI field with a DCI field size indicated by tci-PresentInDCI-ForFormat1_2 is present in the DCI format 1_2 of the PDCCH transmitted on the CORESET. If the PDSCH is scheduled by a DCI format not having the TCI field present, and the time offset between the reception of the DL DCI and the corresponding PDSCH is equal to or greater than a threshold timeDurationForQCL if applicable, where the threshold is based on reported UE capability, for determining PDSCH antenna port QCL, the UE assumes that the TCI state or the QCL assumption for the PDSCH is identical to the TCI state or QCL assumption whichever is applied for the CORESET used for the PDCCH transmission.

In various embodiments, if the PDSCH is scheduled by a DCI format having the TCI field present, the TCI field in DCI in the scheduling component carrier points to the activated TCI states in the scheduled component carrier or DL BWP, the UE may use the TCI-State according to the value of the 'Transmission Configuration Indication' field in the detected PDCCH with DCI for determining PDSCH antenna port QCL. The UE may assume that the DM-RS ports of PDSCH of a serving cell are QCLed with the RSs in the TCI state with respect to the QCL type parameters given by the indicated TCI state if the time offset between the reception of the DL DCI and the corresponding PDSCH is equal to or greater than a threshold timeDurationForQCL, where the threshold is based on reported UE capability. If the UE is configured with a single slot PDSCH, the indicated TCI state may be based on the activated TCI states in the slot with the scheduled PDSCH. If the UE is configured with a multi-slot PDSCH, the indicated TCI state may be based on the activated TCI states in the first slot with the scheduled PDSCH, and UE may expect the activated TCI states are the same across the slots with the scheduled PDSCH. If the UE is configured with CORESET associated with a search space set for cross-carrier scheduling, and the PDCCH carrying the scheduling DCI and the PDSCH scheduled by that DCI are transmitted on the same carrier, the UE expects tci-PresentInDCI is set as 'enabled' or tci-PresentInDCI-ForFormat1_2 is configured for the CORESET, and if one or more of the TCI states configured for the serving cell scheduled by the search space set contains 'QCL-TypeD', the UE expects the time offset between the reception of the detected PDCCH in the search space set and the corresponding PDSCH is larger than or equal to the threshold timeDurationForQCL.

In certain embodiments, independent of the configuration of tci-PresentInDCI and tci-PresentInDCI-ForFormat1_2 in RRC connected mode, if all the TCI codepoints are mapped to a single TCI state and the offset between the reception of the DL DCI and the corresponding PDSCH is less than the threshold timeDurationForQCL, the UE may assume that the DM-RS ports of PDSCH of a serving cell are QCLed with the RSs with respect to the QCL parameters used for PDCCH QCL indication of the CORESET associated with a monitored search space with the lowest controlResource-SetId in the latest slot in which one or more CORESETs within the active BWP of the serving cell are monitored by the UE. In this case, if the 'QCL-TypeD' of the PDSCH DM-RS is different from that of the PDCCH DM-RS with which they overlap in at least one symbol, the UE is expected to prioritize the reception of PDCCH associated with that CORESET. This also applies to the intra-band carrier aggregation ("CA") case (e.g., if PDSCH and the CORESET are in different component carriers). If none of configured TCI states for the serving cell of scheduled PDSCH contains 'QCL-TypeD', the UE may obtain the other QCL assumptions from the indicated TCI states for its scheduled PDSCH irrespective of the time offset between the reception of the DL DCI and the corresponding PDSCH. If a UE configured by higher layer parameter PDCCH-Config that contains two different values of CORESET-PoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH associated with a value of CORESETPoolIndex of a serving cell are QCLed with the RSs with respect to the QCL parameters used for PDCCH QCL indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE. If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of PDSCH of a serving cell are quasi co-located with the RSs with respect to the QCL parameters associated with the TCI states corresponding to the lowest codepoint among the TCI codepoints containing two different TCI states.

In some embodiments, if the PDCCH carrying the scheduling DCI is received on one component carrier, and the PDSCH scheduled by that DCI is on another component carrier: 1) the timeDurationForQCL is determined based on the subcarrier spacing of the scheduled PDSCH—if μPDCCH<μPDSCH, an additional timing delay d is added to the timeDurationForQCL, where d is defined; and/or 2) for both cases if tci-PresentInDCI is set to 'enabled' and the offset between the reception of the DL DCI and the corresponding PDSCH is less than the threshold timeDurationForQCL and if tci-PresentInDCI is not configured, the UE obtains its QCL assumption for the scheduled PDSCH from the activated TCI state with the lowest ID applicable to PDSCH in the active BWP of the scheduled cell.

In various embodiments, for a periodic CSI-RS resource in a NZP-CSI-RS-ResourceSet configured with higher layer parameter trs-Info, the UE may expect that a TCI-State indicates one of the following quasi co-location types: 1) 'QCL-TypeC' with an SS/PBCH block and, when applicable, 'QCL-TypeD' with the same SS/PBCH block; and/or 2) 'QCL-TypeC' with an SS/PBCH block and, when applicable, 'QCL-TypeD' with a CSI-RS resource in an NZP-CSI-RS-ResourceSet configured with higher layer parameter repetition.

In certain embodiments, for an aperiodic CSI-RS resource in a NZP-CSI-RS-ResourceSet configured with higher layer parameter trs-Info, a UE may expect that a TCI-State indicates 'QCL-TypeA' with a periodic CSI-RS resource in a NZP-CSI-RS-ResourceSet configured with higher layer parameter trs-Info and, if applicable, 'QCL-TypeD' with the same periodic CSI-RS resource.

In some embodiments, for a CSI-RS resource in a NZP-CSI-RS-ResourceSet configured without higher layer parameter trs-Info and without the higher layer parameter repetition, the UE may expect that a TCI-State indicates one of the following quasi co-location types: 1) 'QCL-TypeA' with a CSI-RS resource in a NZP-CSI-RS-ResourceSet configured with higher layer parameter trs-Info and, if applicable, 'QCL-TypeD' with the same CSI-RS resource; 2) 'QCL-TypeA' with a CSI-RS resource in a NZP-CSI-RS-ResourceSet configured with higher layer parameter trs-Info and, if applicable, 'QCL-TypeD' with an SS/PBCH block; 3) 'QCL-TypeA' with a CSI-RS resource in a NZP-CSI-RS-ResourceSet configured with higher layer parameter trs-Info and, if applicable, 'QCL-TypeD' with a CSI-RS resource in a NZP-CSI-RS-ResourceSet configured with higher layer parameter repetition; and/or 4) 'QCL-TypeB' with a CSI-RS resource in a NZP-CSI-RS-ResourceSet configured with higher layer parameter trs-Info when 'QCL-TypeD' is not applicable.

In various embodiments, for a CSI-RS resource in a NZP-CSI-RS-ResourceSet configured with higher layer parameter repetition, a UE may expect that a TCI-State indicates one of the following quasi co-location types: 1) 'QCL-TypeA' with a CSI-RS resource in a NZP-CSI-RS-ResourceSet configured with higher layer parameter trs-Info and, if applicable, 'QCL-TypeD' with the same CSI-RS resource; 2) 'QCL-TypeA' with a CSI-RS resource in a NZP-CSI-RS-ResourceSet configured with higher layer parameter trs-Info and, if applicable, 'QCL-TypeD' with a CSI-RS resource in a NZP-CSI-RS-ResourceSet configured with higher layer parameter repetition; and/or 3) 'QCL-TypeC' with an SS/PBCH block and, if applicable, 'QCL-TypeD' with the same SS/PBCH block.

In certain embodiments, for the DM-RS of PDCCH, a UE may expect that a TCI-State indicates one of the following quasi co-location types: 1) 'QCL-TypeA' with a CSI-RS resource in a NZP-CSI-RS-ResourceSet configured with higher layer parameter trs-Info and, if applicable, 'QCL-TypeD' with the same CSI-RS resource; 2) 'QCL-TypeA' with a CSI-RS resource in a NZP-CSI-RS-ResourceSet configured with higher layer parameter trs-Info and, if applicable, 'QCL-TypeD' with a CSI-RS resource in an NZP-CSI-RS-ResourceSet configured with higher layer parameter repetition; and/or 3) 'QCL-TypeA' with a CSI-RS resource in a NZP-CSI-RS-ResourceSet configured without higher layer parameter trs-Info and without higher layer parameter repetition and, if applicable, 'QCL-TypeD' with the same CSI-RS resource.

In some embodiments, for the DM-RS of PDSCH, a UE may expect that a TCI-State indicates one of the following quasi co-location types: 1) 'QCL-TypeA' with a CSI-RS resource in a NZP-CSI-RS-ResourceSet configured with higher layer parameter trs-Info and, if applicable, 'QCL-TypeD' with the same CSI-RS resource; 2) 'QCL-TypeA' with a CSI-RS resource in a NZP-CSI-RS-ResourceSet configured with higher layer parameter trs-Info and, if applicable, 'QCL-TypeD' with a CSI-RS resource in an NZP-CSI-RS-ResourceSet configured with higher layer parameter repetition; and/or 3) 'QCL-TypeA' with a CSI-RS resource in a NZP-CSI-RS-ResourceSet configured without higher layer parameter trs-Info and without higher layer parameter repetition and, if applicable, 'QCL-TypeD' with the same CSI-RS resource.

As used herein, the following terminology may be defined as indicate; however, different terminology is not precluded with similar definitions: 1) beam category group: a beam category group is a group of UEs that have reported similar beam characteristics such as 3 dB beamwidth, antenna virtualization for RX beam, and/or beam shape information; 2) reference line: a reference line is the shortest line between a gNB and UEs for a given location (e.g., may be referred to as line-of-sight) that is defined for a location to give a common reference to all UEs for determining relative orientation of RX beams; 3) virtual reference line: a virtual reference line is the shortest line between an indicated location coordinate by a gNB and UEs location coordinate for a given location; 4) shared reference UE RX beam: a shared reference UE RX beam is the first beam determined for a UE in terms of orientation with respect to the reference line, where the orientation is calculated at a gNB based on measurement of at least one DL RS—a shared reference UE RX beam may need to be determined only once for a UE for a beam category group; 5) shared UE RX beams: shared UE RX beams are configured with a transmission to a UE in terms of relative orientation with respect to a shared reference UE RX beam—shared UE RX beams may be configured with a transmission to a UE only after the shared reference UE RX beam is determined for that UE—no measurements are needed to configure shared UE RX beams for a UE as they are derived based on a relative orientation to the shared reference UE RX beam; 6) shared UE RX beam IDs: shared UE Rx beam IDs are assigned to shared UE RX beams that are common across all the UEs belonging to the same beam category group—a shared UE RX beam ID corresponds to the same beam orientation (and characteristics) for all the UEs in the same beam category group; and/or 7) shared DL RS (e.g., beam): shared DL RS is a common downlink reference signal such as a shared CSI-RS that may be configured by transmission to multiple UEs and associated with at least one shared UE RX beam ID for indicating which RX beams may be used to receive the DL RS at UE—a shared DL RS associated with shared UE RX beam IDs may be used to allow shared measurements across multiple UEs belonging to the same beam category group.

In various embodiments, shared beam-management may be facilitated where the beams may be shared across a group of users based on a set of shared beams that may be configured, indicated, and/or updated for any of the users within a group. The shared beams may be identified by a common and/or shared beam ID across multiple users within a group. Furthermore, the measurements on the shared beams may be performed on one user and may be used as a basis for beam indication for other users within a group.

In certain embodiments, for facilitating shared beam-management: 1) there may be a shared reference UE TX and/or RX beam determined for each of the UEs within a group; 2) there may be other shared UE TX and/or RX beams for each of the UEs within a group configured relative to a respective shared reference UE TX and/or RX beam for each of the UEs; 3) UEs within a group are configured with shared and/or common DL and/or UL RS for measurements and reporting of shared UE RX and/or TX beams (e.g., measurements may not be required to be performed by all UEs on all shared beams); and/or 4) UEs within a group are configured and/or indicated with at least one shared UE TX and/or RX beams for following DL reception and/or UL transmission based on measurements and reporting of shared beams—UE-specific or group-common indication of shared beams may be performed for the UEs within a group based on a predicted and/or determined path, a predicted and/or determined location, and/or a predicted and/or determined mobility.

In some embodiments, beam measurements from one UE may be used to determine and/or indicated the best beams for other UEs and, therefore, measurement and reporting overhead may be reduced in comparison to other embodiments (e.g., new radio ("NR") beam-management).

In various embodiments, a group common indication of best beams may be transmitted to multiple UEs within a group and may help to reduce a dynamic overhead associated with TCI indicated as UE specific signaling for beam indication (e.g., TCI) may be avoided.

In certain embodiments, location-based beam management may be realized based on a shared beam framework. In some embodiments, a beam refinement procedure for UEs may be improved in terms of latency and overhead (e.g., updating from wider beams to narrower beams and vice-versa).

In a first embodiment, there may be a determination of a shared reference UE RX beam. In the first embodiment, a shared reference UE TX and/or RX beam may be determined for each of the UEs within a group, where the beam is determined in terms of angle and/or orientation relative to a reference line, as illustrated in FIG. 4. The reference line may be the same across all UEs for a given location and/or position. In one implementation of the first embodiment, two UEs may be within a group and certain steps may be performed for each of these two UEs to determine a shared reference RX beam for both UEs (e.g., UE1 and UE2).

FIG. 4 is a schematic block diagram illustrating one embodiment of a system 400 for determining a shared reference RX beam for a UE (e.g., a first UE, UE1). The system 400 includes the remote unit 102 (e.g., UE) and the network unit 104 (e.g., gNB). A reference line 402 is shown as a line of sight between the remote unit 102 and the network unit 104. Further, a UE RX beam boresight 404 (e.g., UE RX beam boresight orientation relative to the reference line 402) may be determined at the network unit 104 and/or indicated by the remote unit 102, and a DL TX beam boresight 406 (e.g., DL beam boresight orientation relative to the reference line 402) may be determined.

In some embodiments, for shared reference UE RX beam determination at the remote unit 102 (e.g., UE1): 1) the UE1 is at a first location (e.g., location 1) that is known to the gNB—the UE1 receives DL RS beam 1 by using an RX beam at location 1 and upon receiving DL RS beam 1, the UE1 reports reference signal received power ("RSRP") for the received DL RS beam 1; 2) the gNB checks which beam category group for the UE1 (e.g., beam category 1) determines the orientation for the RX beam relative to the reference line for that location based on RSRP measurements reported by the UE for receiving DL RS such as CSI-RS and/or SSB—for more accurate orientation determination, multiple RSRP measurements for multiple DL RS beams received by the UE at the same location with the same RX beam may be used—once the shared reference UE RX beam orientation is determined by the gNB, it configures a shared UE RX beam ID at least for the reference beam; and 3) if the determined UE Rx beam has already been assigned a beam ID to different a UE within the same beam category group, then the gNB indicates that beam ID to UE1 for this corresponding RX beam or else if the determined RX beam has not yet been assigned a beam ID for any UE belonging to the same beam category group as UE1, then a new beam ID is assigned to this corresponding RX beam, where the ID index is 1 if no beam ID has been assigned to any UE within the same beam category group. Otherwise, a higher beam ID is assigned that is not yet assigned. Beam ID 1 may be assigned to the RX beam which UE 1 used to receive DL beam 1 at location 1 as no other beam ID has been assigned yet.

FIG. 5 is a schematic block diagram illustrating one embodiment of a system 500 for determining a common reference RX beam for the UE. The system 500 includes the remote unit 102 (e.g., UE, UE1) and the network unit 104 (e.g., gNB). A reference line 502 is shown as a line of sight between the remote unit 102 and the network unit 104. Further, a UE RX beam 1 boresight 504 (e.g., UE RX beam 1 boresight orientation with respect to the reference line 502) may be determined at the network unit 104, and a DL TX beam 1 boresight 506 (e.g., DL beam 1 boresight orientation with respect to the reference line 502) may be known by the gNB.

In various embodiments, a second remote unit 102 (e.g., second UE, UE2) is at location 1 that is known to the gNB. The UE2 receives DL RS beam 2 using an RX beam at location 1 and, upon receiving DL RS beam 2, UE2 reports RSRP for receiving DL RS beam 2.

In certain embodiments, the gNB checks the beam category group for UE2 (e.g., beam category 1), determines the orientation for the UL RX beam with respect to the reference line 502 for that location 1, and assigns a beam ID to the RX beam of the UE2, where the beam ID for UE2 RX beam is assigned as follows: if the determined RX beam has already been assigned a beam ID assigned to a different UE, then the gNB indicates the same beam ID to UE2 for this corresponding RX beam, or else if the determined RX beam has not yet been assigned a beam ID to any UE belonging to the same beam category group as UE2, then a new beam ID is assigned to this corresponding RX beam, where the ID index is 1 if no common beam ID has been assigned to any UE within the same beam category group as the UE. Otherwise, a higher beam ID is assigned (e.g., that is not yet assigned). As illustrated in FIG. 6, a beam ID 2 is assigned to the RX beam which UE2 used to receive DL beam 2 at location 1, as beam ID 1 is already assigned to UE1 (e.g., belonging to same beam category group) for another RX beam.

FIG. 6 is a schematic block diagram illustrating another embodiment of a system 600 for determining a common reference RX beam for the UE. The system 600 includes the remote unit 102 (e.g., UE, UE2) and the network unit 104 (e.g., gNB). A reference line 602 is shown as a line of sight between the remote unit 102 and the network unit 104. Further, a UE RX beam 2 boresight 604 (e.g., UE RX beam 2 boresight orientation with respect to the reference line 602) may be determined at the network unit 104, and a DL TX beam 2 boresight 606 (e.g., DL beam 2 boresight orientation with respect to the reference line 602) may be known by the gNB.

In some embodiments, an orientation of a shared reference UE RX beam is determined by the gNB by performing RSRP measurements of the DL RS. An RSRP measurements-based method to determine the reference beam is described in relation to FIG. 7. The UE reference beam direction may be estimated based on measuring and reporting of the RSRP of the DL beam. For a given DL beam, the gNB estimates the potential maximum RSRP at a UE based on pre-knowledge of a distance to the UE, a beamforming gain of the UE beam (e.g., Bfg), hardware losses (e.g., hl) of the UE receiver, and so forth, such as using: $maxRSRP \approx Bfg-hl+Prx$ (dBm), where Prx is calculated based on the path loss of Ptx. The UE measures the RSRP_UE on the configured CSI-RS resources for one or more DL beams and reports it to gNB, as: $RSRP\_UE \approx Bfg-hl+Prx-\Delta$ (dBm), where $\Delta$ is the drop of the power from the main loop of the RX beam. The gNB maps the reported RSRP_UE and compares it with the maxRSRP to estimate the deviation of UE's RX beam and/or UE orientation via: $\Delta \approx maxRSRP-RSRP\_UE \rightarrow \theta$.

FIG. 7 is a schematic block diagram illustrating one embodiment of a system 700 for determining a reference line orientation based on RSRP measurement. The system 700 includes the remote unit 102 (e.g., UE) and the network unit 104 (e.g., gNB). A reference line 702 is shown as a line of sight between the remote unit 102 and the network unit 104. Further, a UE RX beam 704 having a Pmax_rx and a DL TX beam 706 having a Pmax_tx are illustrated. Moreover, Prx 708, Ptx 710, θ 712, and RSRP_UE 714 are shown.

Table 1 shows one example of values for calculating the UE's RX beam deviation

TABLE 1

| RSRP_UE | Δ to maxRSPR (−30 dBm) | Main loop beam deviation θ from the reference line (LOS) in degrees |
|---|---|---|
| −35 dBm | 5 dB | 15° |
| −40 dBm | 10 dB | 35° |
| −45 dBm | 15 dB | 55° |

In certain embodiments, for better estimation of the beam deviation during a reference beam determination period, a UE may receive periodic CSI-RS on consecutive slots with the same QCL and reports the averaged cri-RSRPs, or receives multiple DL beams with different QCL assumptions and reports RSRP for each DL beam. The UE may use the conventional angle of arrival ("AoA") measurements-based method to determine the reference beam.

In some embodiments, a UE estimates the AoA of the DL beam using the same panel used for RX beam. An RX beam direction angle (Ψ) may be an RX beam deviation from a UE panel axis based on states of phase shifters. The UE may measure AoA Φ based on comparing DL beam signal phases on multiple antenna elements (φp1, φp2) before phase shifters. The reference beam direction and/or UE orientation may be $\theta = \Phi + \Psi$.

In various embodiments, a beam deviation from a reference beam may be translated into θGCS, where θGCS is a deviation angle according to a global coordinate system ("GCS"), which may be translated from a local coordinate system ("LCS") given by θ angles. This may be required since the UE antenna array is based on the LCS and the orientation is in general different from the GCS orientation and, therefore, it may be necessary to map the vector fields of the array elements from the LCS to the GCS.

In certain embodiments, a gNB indicates a location coordinate (e.g., not actual gNB coordinates, may be any coordinates) to a UE and the UE may assume a virtual reference line between the indicated location coordinate and its own location. This may or may not be the reference line (e.g., actual reference line) between the UE and the gNB, as shown in FIG. 8. If the location coordinates indicated by the gNB lie at one of the points along the reference line, then both the virtual reference line and the actual reference are the same. However, for any other location coordinates, the virtual reference line and the actual reference line are different. From the UE perspective, the actual reference line is not known since it doesn't know the location coordinates of the gNB. Therefore, based on the virtual reference line, the UE knows the relative angle with respect to the virtual reference line of the UE shared reference UE beam and indicates this angle to the UE.

In some embodiments, an orientation of a UE shared reference RX beam doesn't need to be determined by a gNB, but is directly indicated to the gNB (e.g., relative to a virtual reference line) by the UE and, therefore, this is accurate and works for all the cases even if there is no line-of-sight. No RSRP measurements are specifically needed to determine the UE shared reference RX beam.

FIG. 8 is a schematic block diagram illustrating one embodiment of a system 800 having a virtual reference line and an actual reference line. The system 800 includes the remote unit 102 (e.g., UE) and the network unit 104 (e.g., gNB). A virtual reference line 802 is known to the remote unit 102 based on its own coordinates and coordinates 804 indicated by the network unit 104. A UE RX beam 1 boresight 806 (e.g., shared reference RX beam, shared beam ID 1) is illustrated. Moreover, an angle between the UE RX beam 1 boresight 806 and the virtual reference line 802 is indicated to the network unit 104. An actual reference line 808 is shown as a line of sight between the remote unit 102 and the network unit 104, but it is not known to the remote unit 102 and the actual location of the network unit 104 is not known to the remote unit 102.

In various embodiments, if beam correspondence can be assumed, then the SRS can be used to determine the angle of shared reference UE RX beam angle from the reference line. Basically, based on the SRS reception at the gNB, the UL AoA can be determined according to existing positioning techniques. Once the UL AoA is estimated at the gNB and as the UL RX beam angle relative to reference line is known at gNB, then gNB can easily determine the angle of UE RX beam relative to reference line.

In certain embodiments, an orientation of a reference beam can be determined using a LTE positioning protocol ("LPP"), where a UE may be indicated with trp-Location IE, which provides the UE with the location of the TRP relative to the reference Point location. Based on this reference point the reference line is determined, and the orientation of shared reference beam may be determined related to this reference line.

In some embodiments, one or more procedures for determining a UE RX beam may be used to determine UE TX beam and UE supporting beam correspondence.

In a second embodiment, there may be a shared (e.g., not reference) UE RX beam determination. According to the second embodiment, a gNB configures shared RX beam IDs and their orientation relative to a shared reference UE RX beam. In one implementation, radio resource control ("RRC") signaling may configure multiple shared RX beams and corresponding IDs to each of the UEs within a group. In another implementation, for UE1, a shared beam ID 2 is assigned relative to reference RX beam 1 that has been assigned. The relation of shared beam ID 2 may be in terms of angle in a clockwise or counterclockwise direction relative to the shared reference UE RX beam for that UE.

Figure 9:
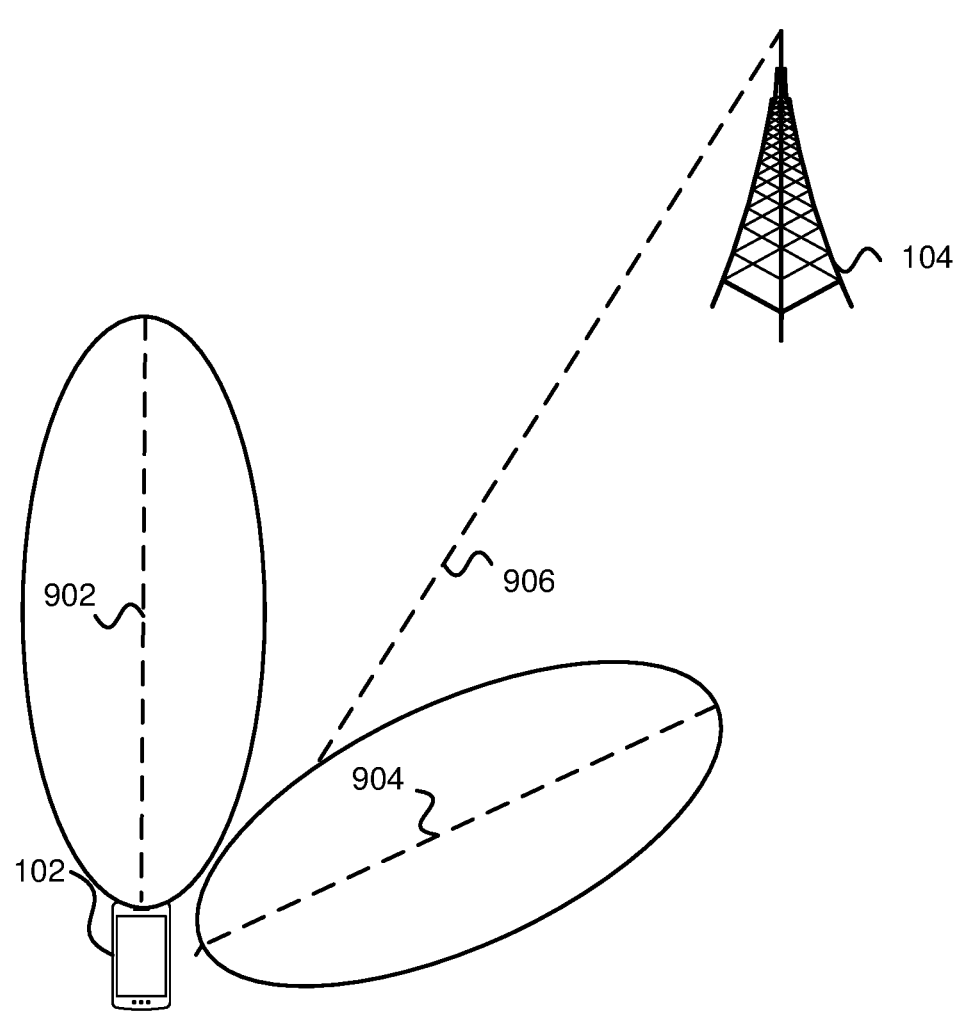
FIG. 9 is a schematic block diagram illustrating one embodiment of a system for other shared RX beam assignment for a first UE based on shared RX beams determined for other UEs that belong to the same beam category group.

FIG. 9 is a schematic block diagram illustrating one embodiment of a system 900 for other shared RX beam assignment for a first UE (e.g., UE1) based on shared RX beams determined for other UEs that belong to the same beam category group (e.g., UE2 in this example in beam category 1). The system 900 includes the remote unit 102 (e.g., UE1) and the network unit 104 (e.g., gNB). A UE RX beam 1 boresight 902 (e.g., shared reference RX beam, shared beam ID 1), and a UE RX beam 2 boresight 904 (e.g., shared RX beam determined for UE2, shared beam ID 2) are illustrated. Moreover, a reference line 906 is shown as a line of sight between the remote unit 102 and the network unit 104.

In various embodiments, if multiple UEs within a group have the same shared reference beam, then a group-common RRC configuration may be used to configured shared beams, corresponding IDs, and relative angles and/or orientations to shared reference beam for all UEs.

In a third embodiment, there may be a shared DL RS (e.g., DL TX beam) for measurement, reporting, and beam indication. According to the third embodiment, the shared DL RS is configured by transmission to UEs within a group for performing measurements and corresponding reporting, where each of the configured shared RS are associated (e.g., QCL-ed with directional beams) with a shared UE RX beam ID. This may enable the UE to update the RX beam to receive and measure the corresponding DL RS.

In one implementation of the third embodiment, the gNB configures only one UE within a group with a shared DL RS for performing measurements using the shared UE RX beams and reporting back corresponding beams and respective RSRP. Based on these measurements, the gNB indicates one or more beams to all the UEs within a group for DL reception within a configured geographical region and/or within a configured time duration.

In alternate implementation, the gNB configures multiple UEs within a group to perform measurements on a different set of shared DL RS such that no two UEs need to perform measurements on the same DL RS beam within a certain time duration. Based on the measurements by multiple UEs, the gNB indicates one or more beams to all the UEs within a group for DL reception within a configured geographical region and/or within a configured time duration.

In certain embodiments, multiple shared beams are indicated to a group of UEs based on predicted path and/or location coordinates such that two different UEs within the same group are expected to apply the same shared UE TX and/or RX beam at a given location. In one implementation, the same shared beam is applied by UEs for a location within a certain duration. If the duration is above a threshold, a different shared beam can be applied by a UE.

In some embodiments, a group-common DCI is used to indicate the same set of shared beams to a group of UEs for DL reception and/or UL transmission. In one implementation, if a UE is additionally indicted by beams by UE-specific DCI, then it may be expected that the UE applies the beam indicated by the UE-specific DCI (e.g., overriding the beam indicated by group-common DCI).

In various embodiments, if a second UE (e.g., UE-2) follows a path of a first UE (e.g., UE-1), both UE-1 and UE-2 may be grouped using a radio network temporary identifier ("RNTI") (e.g., where a new group common RNTI is configured for this purpose and the TCI state table may be configured as group specific and/or location specific and a group common DCI may indicate which of the TCI state table (e.g., identifier) is currently activated).

In certain embodiments, UE1 and UE2 that are configured with the same shared RS ID may be indicated with a shared or common TCI state for UE specific (e.g., unicast) PDSCH reception or PUSCH transmission in DCI.

In some embodiments, UE1 and UE2 that are configured with the same shared RS ID may be indicated with a shared or common TCI state and there may be a UE specific DCI indicating a QCL-D relationship between a shared and/or common TCI state and the UE specific beam and/or TCI state.

In various embodiments, UE1 and UE2 that are configured with the same shared RS ID and/or TCI state and/or beam may be configured with a UE specific (e.g., relative) time domain offset parameter which is defined in terms of number of symbols and/or slots and the time domain offset may be semi-statically configured using RRC or dynamically indicated in UE specific DCI. If a UE is indicated with a shared and/or common TCI state and/or beam, time domain offset may be used to determine if this shared beam and/or TCI state may be actually applied for PDSCH reception or PUSCH transmission. In one example, UE specific (e.g., relative) time domain offset parameter (X) may be configured as t0 for UE1 and t0+X for UE2 and X may be calculated from the reception of shared TCI state and/or beam in the group common DCI and actual UE specific PDSCH reception and/or PUSCH transmission.

In a fourth embodiment, there may be QCL of a UE-specific RS (e.g., beam) with a shared RS (e.g., beam). According to the fourth embodiment, the UE may be configured with both shared UE TX and/or RX beams and UE-specific TX and/or RX beams, where the UE-specific TX and/or RX beam can be QCL-ed (e.g., in terms of directional beam) with a shared UE TX and/or RX beam ID and/or vice-versa. In certain embodiments, measurements from UE-specific RS may be used for shared UE beams if they are QCL-ed (e.g., in terms of directional beams) and/or vice-versa. In some embodiments, a type of QCL relationship (e.g., QCL A; QCL B; QCL C; QCL D) may be semi-statically or dynamically indicated to UEs.

In a fifth embodiment, there may be beam category group configuration and/or reporting. According to the fifth embodiment, multiple beam category groups may be configured by a gNB to UEs and the UEs may report back a beam category group. This may enable shared beam assignment to only a group of UEs that have similar beam properties. For defining a beam category group, the following may be considered: 1) 3 dB beamwidth; 2) beam shape information; 3) antenna virtualization for a UE RX beam; and/or 4) azimuth and elevation angular information associated with a UE-specific RS.

In various embodiments, for configuration and reporting of a beam category group, the following may be performed: 1) a gNB configures UEs with multiple beam category groups corresponding to different beam properties with RRC configuration—an RRC table may be configured with an index pointing to a beam category group; 2) the gNB requests that the UE report back at least one of the configured beam category groups; and/or 3) the UE indicates at least one of the configured beam category groups by indicating an index of the RRC configured table.

In certain embodiments, a UE may request to update a beam category group.

In a sixth embodiment, there may be a beam category group update. According to the sixth embodiment, a UE may be enabled to update a beam category group (e.g., the UE has the possibility to indicate to a gNB that it would like to use different beam characteristics such as by switching from a wide beam category to a narrow beam category). In the sixth embodiment, if the UE has indicated the switching from one beam category to another beam category, a new set of shared beam IDs (e.g., for that beam category group) may be configured with a transmission to the UE.

In some embodiments, a UE follows the same procedure as described in the first embodiment and the second embodiment to determine a shared reference RX beam for a new beam category group and then get configured with other shared beam IDs relative to a new shared reference UE RX beam.

In various embodiments, new shared beams are determined based on a relation between old beam category group properties and new beam category group properties. In one implementation, as illustrated in FIG. 10, if the new beam category is a narrower beam category with 3 dB beamwidth for a new beam category equal to half the 3 dB beamwidth of an old beam category, then a first common beam (ID1) and a second common beam (ID2) are transformed into a new first common beam (ID1), a new second common beam (ID2), a new third common beam (ID3), and/or a new fourth common beam (ID4). The exact configuration in terms of relative orientation between new common beams and old common beams may be configured by the gNB. This may be a fast method to assign new common beams.

FIG. 10 is a schematic block diagram illustrating one embodiment of a system 1000 for determining new common beams relative to old common beams on a beam category update. The system 1000 includes the remote unit 102 (e.g., UE1) and the network unit 104 (e.g., gNB). A first beam 1002, a second beam 1004, a third beam 1006, and a fourth beam 1008 are illustrated as part of a new beam category to replace an old beam category having a first old beam and a second old beam. An actual reference line 1010 is shown as a line of sight between the remote unit 102 and the network unit 104.

In a seventh embodiment, there may be a reference UE configuration. According to the seventh embodiment, a gNB may configure a reference UE with a known location (e.g., either fixed or predetermined to be at certain location points) to determine a shared reference UE TX and/or RX beam based on particular location information characteristics (e.g., the same location coordinates or area corresponding to a defined zone). The reference UE may therefore assist the network in determining shared UE beam characteristics, which may be useful for other UEs with the same location information characteristics. The reference UE may also be capable of belonging to different beam category groups as defined in the fifth embodiment and as a result the reference UE may also assist the gNB in determining the appropriate beam category for different UEs.

In certain embodiments, a reference UE may also be used for UE beam calibration prior to final deployment of TRPs (e.g., offline calibration) based on different location information characteristics. This may also account for any beam orientation impairments related to, but not limited to, radiation pattern errors which are affected due to mutual coupling as well as amplitude and phase errors. In some embodiments, a location management function ("LMF") may signal a reference UE configuration and a corresponding reference UE reports to a gNB for determining a shared reference UE TX and/or RX beam.

In an eighth embodiment, there may be UE grouping based on location. According to the eighth embodiment, UEs are grouped together based on a location region. In one embodiment of the eighth embodiment, a gNB groups the UEs in the same group based on a range of location coordinates and UEs within the same group are assigned with shared and/or common DL RX beams (e.g., DL RS) and/or UL TX beams (e.g., UL RS). In another embodiment of the eighth embodiment, grouping may be based on neighboring SSBs, where UEs able to receive on set of neighboring SSB beams may be grouped together. For example, if a first UE is able to receive a first SSB and a second UE is able to receive a second SSB, then these two UEs may be grouped together.

In some embodiments, UE grouping based only on location may be applied.

In various embodiments, grouping may be done based on location as well as beam category group (e.g., UEs within a same location region and that have the same beam category groups are grouped together with shared and/or common DL RX beams (e.g., DL RS) and/or UL TX beams (e.g., UL RS).

In certain embodiments, a UE may be grouped together based on similar RSRP measurements on a same set of SSBs (and/or DL RS) beams. For example, a range of RSRP is defined and, if two UEs have measurements within the same range on the RSRP on the same set of SSBs, then the UEs can be grouped together.

In some embodiments, different combinations of UE grouping based on location, measurements, UE type (e.g., enhanced mobile broadband ("eMBB") or ultra-reliable low-latency communication ("URLLC")), and/or beam category group may be configured and/or indicated by a gNB for shared RS beams measurements and an update and/or indication.

FIG. 11 is a flow chart diagram illustrating one embodiment of a method 1100 for configuring shared reference beams. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102, at a user equipment from a network entity, a first configuration including a first shared reference beam and a first beam identifier (ID) associated with the first shared reference beam. In some embodiments, the method 1100 includes receiving 1104, from the network entity, a second configuration including a second shared reference beam relative to the first shared reference beam and a second beam ID associated with the second shared reference beam. In certain embodiments, the method 1100 includes receiving 1106, from the network entity, a third configuration including shared reference signals for channel measurement and reporting. The shared reference signals are quasi-co-located with the first shared reference beam. In various embodiments, the method 1100 includes receiving 1108, from the network entity, a fourth configuration including a shared beam ID for wireless communication with the network entity, the shared beam ID including the first beam ID, the second beam ID, or a combination thereof. In some embodiments, the method 1100 includes performing 1110 the wireless communication using a shared beam associated with the shared beam ID.

In certain embodiments, the method 1100 further comprises receiving information from the network, wherein the information indicates reference point coordinates for determining a reference line for calculating an orientation of the first shared reference beam. In some embodiments, the reference point coordinates are coordinates of at least one transmission and reception point (TRP). In various embodiments, the reference point coordinates are not coordinates of at least one TRP.

In one embodiment, the method 1100 further comprises receiving information from the network, wherein the information configures multiple beam category groups, and each beam category group of the multiple beam category groups is associated with a beam category group ID and parameters corresponding to a beam type. In certain embodiments, the beam type comprises a 3 dB beamwidth, a specific beam shape, a specific antenna virtualization pattern, or some combination thereof. In some embodiments, the method 1100 further comprises receiving information from the network, wherein the information indicates at least one beam category group.

In various embodiments, the method 1100 further comprises requesting that the network trigger a beam category group update, wherein the request indicates a new beam category group different from a previous beam category group indicated by the UE. In one embodiment, the method 1100 further comprises indicating a change from wide beams to narrow beams based on the beam category group update. In certain embodiments, the method 1100 further comprises indicating a change from narrow beams to wide beams based on the beam category group update.

Figure 12:
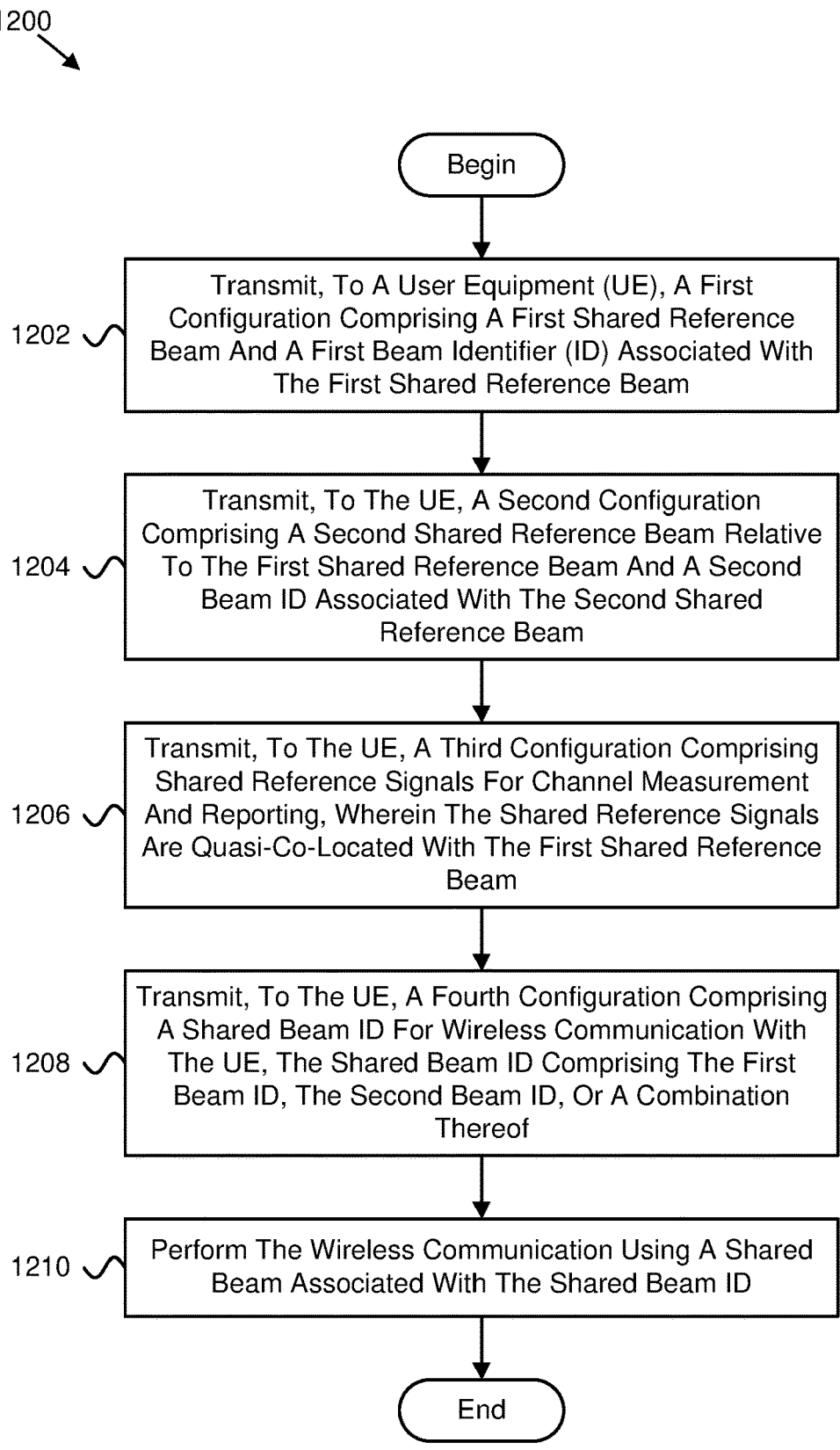
FIG. 12 is a flow chart diagram illustrating another embodiment of a method for configuring shared reference beams.

FIG. 12 is a flow chart diagram illustrating another embodiment of a method 1200 for configuring shared reference beams. In some embodiments, the method 1200 is performed by an apparatus, such as the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes transmitting 1202, from a base station to a user equipment (UE), a first configuration including a first shared reference beam and a first beam identifier (ID) associated with the first shared reference beam. In some embodiments, the method 1200 includes transmitting 1204, to the UE, a second configuration including a second shared reference beam relative to the first shared reference beam and a second beam ID associated with the second shared reference beam. In certain embodiments, the method 1200 includes transmitting 1206, to the UE, a third configuration including shared reference signals for channel measurement and reporting. The shared reference signals are quasi-co-located with the first shared reference beam. In various embodiments, the method 1200 includes transmitting 1208, to the UE, a fourth configuration including a shared beam ID for wireless communication with the UE, the shared beam ID including the first beam ID, the second beam ID, or a combination thereof. In some embodiments, the method 1200 includes performing 1210 the wireless communication using a shared beam associated with the shared beam ID.

In certain embodiments, the method 1200 further comprises determining a reference line between a location point of the base station and a UE location point, and estimating an orientation of the first shared reference beam relative to the reference line based on measurements reported by the UE for receiving at least one downlink (DL) reference signal (RS) beam, wherein a UE RX beam is used to receive the at least one DL RS beam. In some embodiments, the reference line is the same for all UEs at a given location point.

In one embodiment, an apparatus comprises a user equipment (UE). The apparatus further comprises: a transceiver that: receives, from a network entity, a first configuration comprising a first shared reference beam and a first beam identifier (ID) associated with the first shared reference beam; receives, from the network entity, a second configuration comprising a second shared reference beam relative to the first shared reference beam and a second beam ID associated with the second shared reference beam; receives, from the network entity, a third configuration comprising shared reference signals for channel measurement and reporting, wherein the shared reference signals are quasi-co-located with the first shared reference beam; receives, from the network entity, a fourth configuration comprising a shared beam ID for wireless communication with the network entity, the shared beam ID comprising the first beam ID, the second beam ID, or a combination thereof, and performs the wireless communication using a shared beam associated with the shared beam ID.

In certain embodiments, the transceiver receives information from the network, wherein the information indicates reference point coordinates for determining a reference line for calculating an orientation of the first shared reference beam.

In some embodiments, the reference point coordinates are coordinates of at least one transmission and reception point (TRP).

In various embodiments, the reference point coordinates are not coordinates of at least one TRP.

In one embodiment, the transceiver receives information from the network, wherein the information configures multiple beam category groups, and each beam category group of the multiple beam category groups is associated with a beam category group ID and parameters corresponding to a beam type.

In certain embodiments, the beam type comprises a 3 dB beamwidth, a specific beam shape, a specific antenna virtualization pattern, or some combination thereof.

In some embodiments, the transceiver receives information from the network, wherein the information indicates at least one beam category group.

In various embodiments, the transceiver requests that the network trigger a beam category group update, wherein the request indicates a new beam category group different from a previous beam category group indicated by the UE.

In one embodiment, the transceiver indicates a change from wide beams to narrow beams based on the beam category group update.

In certain embodiments, the transceiver indicates a change from narrow beams to wide beams based on the beam category group update.

In one embodiment, a method of a user equipment (UE) comprises: receiving, from a network entity, a first configuration comprising a first shared reference beam and a first beam identifier (ID) associated with the first shared reference beam; receiving, from the network entity, a second configuration comprising a second shared reference beam relative to the first shared reference beam and a second beam ID associated with the second shared reference beam; receiving, from the network entity, a third configuration comprising shared reference signals for channel measurement and reporting, wherein the shared reference signals are quasi-co-located with the first shared reference beam; receiving, from the network entity, a fourth configuration comprising a shared beam ID for wireless communication with the network entity, the shared beam ID comprising the first beam ID, the second beam ID, or a combination thereof, and performing the wireless communication using a shared beam associated with the shared beam ID.

In certain embodiments, the method further comprises receiving information from the network, wherein the information indicates reference point coordinates for determining a reference line for calculating an orientation of the first shared reference beam.

In some embodiments, the reference point coordinates are coordinates of at least one transmission and reception point (TRP).

In various embodiments, the reference point coordinates are not coordinates of at least one TRP.

In one embodiment, the method further comprises receiving information from the network, wherein the information configures multiple beam category groups, and each beam category group of the multiple beam category groups is associated with a beam category group ID and parameters corresponding to a beam type.

In certain embodiments, the beam type comprises a 3 dB beamwidth, a specific beam shape, a specific antenna virtualization pattern, or some combination thereof.

In some embodiments, the method further comprises receiving information from the network, wherein the information indicates at least one beam category group.

In various embodiments, the method further comprises requesting that the network trigger a beam category group update, wherein the request indicates a new beam category group different from a previous beam category group indicated by the UE.

In one embodiment, the method further comprises indicating a change from wide beams to narrow beams based on the beam category group update.

In certain embodiments, the method further comprises indicating a change from narrow beams to wide beams based on the beam category group update.

In one embodiment, an apparatus comprises a base station. The apparatus further comprises: a transceiver that: transmits, to a user equipment (UE), a first configuration comprising a first shared reference beam and a first beam identifier (ID) associated with the first shared reference beam; transmits, to the UE, a second configuration comprising a second shared reference beam relative to the first shared reference beam and a second beam ID associated with the second shared reference beam; transmits, to the UE, a third configuration comprising shared reference signals for channel measurement and reporting, wherein the shared reference signals are quasi-co-located with the first shared reference beam; transmits, to the UE, a fourth configuration comprising a shared beam ID for wireless communication with the UE, the shared beam ID comprising the first beam ID, the second beam ID, or a combination thereof, and performs the wireless communication using a shared beam associated with the shared beam ID.

In certain embodiments, the apparatus further comprises a processor that determines a reference line between a location point of the base station and a UE location point, and estimating an orientation of the first shared reference beam relative to the reference line based on measurements reported by the UE for receiving at least one downlink (DL) reference signal (RS) beam, wherein a UE RX beam is used to receive the at least one DL RS beam.

In some embodiments, the reference line is the same for all UEs at a given location point.

In one embodiment, a method of a base station comprises: transmitting, to a user equipment (UE), a first configuration comprising a first shared reference beam and a first beam identifier (ID) associated with the first shared reference beam; transmitting, to the UE, a second configuration comprising a second shared reference beam relative to the first shared reference beam and a second beam ID associated with the second shared reference beam; transmitting, to the UE, a third configuration comprising shared reference signals for channel measurement and reporting, wherein the shared reference signals are quasi-co-located with the first shared reference beam; transmitting, to the UE, a fourth configuration comprising a shared beam ID for wireless communication with the UE, the shared beam ID comprising the first beam ID, the second beam ID, or a combination thereof, and performing the wireless communication using a shared beam associated with the shared beam ID.

In certain embodiments, the method further comprises determining a reference line between a location point of the base station and a UE location point, and estimating an orientation of the first shared reference beam relative to the reference line based on measurements reported by the UE for receiving at least one downlink (DL) reference signal (RS) beam, wherein a UE RX beam is used to receive the at least one DL RS beam.

In some embodiments, the reference line is the same for all UEs at a given location point.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
  receive, from a network entity, a group-common first configuration comprising a first shared reference beam and a first beam identifier (ID) associated with the first shared reference beam;
  receive, from the network entity, a group-common second configuration comprising a second shared reference beam relative to the first shared reference beam and a second beam ID associated with the second shared reference beam;
  receive, from the network entity, a third configuration comprising shared reference signals that are for channel measurement and reporting and that are quasi-co-located with the first shared reference beam, wherein the shared reference signals are quasi-co-located with the first shared reference beam;
  receive, from the network entity, a fourth configuration comprising a shared beam ID for wireless communication with the network entity, the shared beam ID comprising the first beam ID, the second beam ID, or a combination thereof; and
  perform the wireless communication using a shared beam associated with the shared beam ID.

2. The UE of claim 1, wherein the at least one processor is configured to cause the UE to receive information from the network entity, wherein the information indicates reference point coordinates for determining a reference line for calculating an orientation of the first shared reference beam.

3. The UE of claim 2, wherein the reference point coordinates are coordinates of at least one transmission and reception point (TRP).

4. The UE of claim 2, wherein the reference point coordinates are not coordinates of at least one transmission and reception point (TRP).

5. The UE of claim 1, wherein the at least one processor is configured to cause the UE to receive information from the network entity, wherein the information configures multiple beam category groups, and each beam category group of the multiple beam category groups is associated with a beam category group ID and parameters corresponding to a beam type.

6. The UE of claim 5, wherein the beam type comprises a 3 dB beamwidth, a specific beam shape, a specific antenna virtualization pattern, or some combination thereof.

7. The UE of claim 1, wherein the at least one processor is configured to cause the UE to receive information from the network entity, wherein the information indicates at least one beam category group.

8. The UE of claim 1, wherein the at least one processor is configured to cause the UE to request that the network entity trigger a beam category group update, wherein the request indicates a new beam category group different from a previous beam category group indicated by the UE.

9. The UE of claim 8, wherein the at least one processor is configured to cause the UE to indicate a change from wide beams to narrow beams based on the beam category group update.

10. The UE of claim 8, wherein the at least one processor is configured to cause the UE to indicate a change from narrow beams to wide beams based on the beam category group update.

11. A method performed by a user equipment (UE), the method comprising:
  receiving, from a network entity, a group-common first configuration comprising a first shared reference beam and a first beam identifier (ID) associated with the first shared reference beam;
  receiving, from the network entity, a group-common second configuration comprising a second shared reference beam relative to the first shared reference beam and a second beam ID associated with the second shared reference beam;
  receiving, from the network entity, a third configuration comprising shared reference signals that are for channel measurement and reporting and that are quasi-co-located with the first shared reference beam, wherein the shared reference signals are quasi-co-located with the first shared reference beam;
  receiving, from the network entity, a fourth configuration comprising a shared beam ID for wireless communication with the network entity, the shared beam ID comprising the first beam ID, the second beam ID, or a combination thereof; and
  performing the wireless communication using a shared beam associated with the shared beam ID.

12. The method of claim 11, further comprising receiving information from the network entity, wherein the information indicates reference point coordinates for determining a reference line for calculating an orientation of the first shared reference beam.

13. A base station, comprising:
at least one memory; and
at least one processor coupled with the at least one memory and configured to cause the base station to:
  transmit, to a user equipment (UE), a group-common first configuration comprising a first shared reference beam and a first beam identifier (ID) associated with the first shared reference beam;
  transmit, to the UE, a group-common second configuration comprising a second shared reference beam relative to the first shared reference beam and a second beam ID associated with the second shared reference beam;
  transmit, to the UE, a third configuration comprising shared reference signals that are for channel measurement and reporting and that are quasi-co-located with the first shared reference beam, wherein the shared reference signals are quasi-co-located with the first shared reference beam;

transmit, to the UE, a fourth configuration comprising a shared beam ID for wireless communication with the UE, the shared beam ID comprising the first beam ID, the second beam ID, or a combination thereof; and perform the wireless communication using a shared beam associated with the shared beam ID.

14. The base station of claim 13, wherein the at least one processor is further configured to cause the base station to determine a reference line between a location point of the base station and a UE location point, and estimating an orientation of the first shared reference beam relative to the reference line based on measurements reported by the UE for receiving at least one downlink (DL) reference signal (RS) beam, wherein a UE RX beam is used to receive the at least one DL RS beam.

15. The base station of claim 14, wherein the reference line is the same for all UEs at a given location point.

16. A processor for wireless communication, comprising:

at least one controller coupled with at least one memory and configured to cause the processor to:

receive, from a network entity, a group-common first configuration comprising a first shared reference beam and a first beam identifier (ID) associated with the first shared reference beam;

receive, from the network entity, a group-common second configuration comprising a second shared reference beam relative to the first shared reference beam and a second beam ID associated with the second shared reference beam;

receive, from the network entity, a third configuration comprising shared reference signals that are for channel measurement and reporting and that are quasi-co-located with the first shared reference beam, wherein the shared reference signals are quasi-co-located with the first shared reference beam;

receive, from the network entity, a fourth configuration comprising a shared beam ID for wireless communication with the network entity, the shared beam ID comprising the first beam ID, the second beam ID, or a combination thereof; and perform the wireless communication using a shared beam associated with the shared beam ID.

17. The processor of claim 16, wherein the at least one controller is configured to cause the processor to receive information from the network entity, wherein the information indicates reference point coordinates for determining a reference line for calculating an orientation of the first shared reference beam.

18. The processor of claim 17, wherein the reference point coordinates are coordinates of at least one transmission and reception point (TRP).

19. The processor of claim 17, wherein the reference point coordinates are not coordinates of at least one TRP.

20. The processor of claim 16, wherein the at least one controller is configured to cause the processor to receive information from the network entity, wherein the information configures multiple beam category groups, and each beam category group of the multiple beam category groups is associated with a beam category group ID and parameters corresponding to a beam type.

* * * * *